US006045211A

United States Patent [19]

Tokuda

[11] Patent Number: 6,045,211

[45] Date of Patent: Apr. 4, 2000

[54] SENSOR AND INK JET RECORDER INCLUDING SAME

[75] Inventor: Hiroshi Tokuda, Anjou, Japan

[73] Assignee: Brother Kogyo Kabushiki Kaisha, Nagoya, Japan

[21] Appl. No.: 09/118,004

[22] Filed: Jul. 17, 1998

[30] Foreign Application Priority Data

| | | | |
|---|---|---|---|
| Jul. 18, 1997 | [JP] | Japan | 9-194527 |
| Jul. 18, 1997 | [JP] | Japan | 9-194528 |
| Jul. 18, 1997 | [JP] | Japan | 9-194530 |

[51] Int. Cl.[7] .............................. B41J 2/165; G01D 13/22

[52] U.S. Cl. ................................ 347/33; 347/23; 116/303

[58] Field of Search ......................... 347/33, 23; 400/207, 400/208; 101/423, 424; 116/280, 284, 303

[56] References Cited

U.S. PATENT DOCUMENTS

| | | | |
|---|---|---|---|
| 5,223,860 | 6/1993 | Loofbourow et al. | 346/140 R |
| 5,243,485 | 9/1993 | Weiley | 360/132 |

FOREIGN PATENT DOCUMENTS

| | | |
|---|---|---|
| 5-193152 | 8/1993 | Japan . |
| 8-305325 | 11/1996 | Japan . |
| 8-323999 | 12/1996 | Japan . |

*Primary Examiner*—John S. Hilten
*Assistant Examiner*—Daniel J. Colilla
*Attorney, Agent, or Firm*—Oliff & Berridge, PLC

[57] ABSTRACT

A detector detects the presence of a roll of a strip-like material within a cassette in a maintenance unit used in an ink-jet printer. The detector has a first movable part to rotate and press a switch when the cassette is not positioned at the predetermined mounting position, and a second movable part to rotate and press the switch when less than a predetermined amount of the strip resides in the cassette. The detector, based on the pressed state of the switch, detects whether the maintenance operation can be started. The detector has a pair of pivot arms which each have a similar shaped portion to the other so as to fold into each other and which project into the interior of the cassette when no roll resides in the cassette. When there is a roll inside the cassette, one arm comes in contact with the roll so that the arms retract from the cassette by folding the similar shaped portions into each other.

21 Claims, 16 Drawing Sheets

SENSOR AND INK JET RECORDER INCLUDING SAME

BACKGROUND OF THE INVENTION

1. Field of the Invention

The present invention relates to a sensor which can detect an object such as a roll of paper held in a cassette and an ink-jet recording apparatus having it therein. Specifically the present invention relates to an ink-jet recording apparatus including: a sensor which is used in a maintenance mechanism in an ink-jet recording apparatus and is suitable for detecting a roll-like head cleaning paper held in a cassette; and the cassette.

2. Description of the Related Art

An ink-jet printer has a maintenance mechanism for cleaning the ink-jet head which ejects ink. For example, the maintenance mechanism in an ink-jet recording apparatus disclosed in Japanese Patent Application Laid-Open No.8-323,999, uses a roll of paper for cleaning. Upon maintenance, ink is forced to eject out from the ink-jet head toward the cleaning paper which has been pulled out from the roll of paper so that dust, air bubbles, etc. within the nozzle may be removed with the ink, and any ink on the nozzle surface is wiped by the cleaning paper. In this case, the paper is fed from the roll so that clean, unused cleaning paper opposes the ink-jet head. Thus, such a maintenance mechanism is used to clean the recording head so as to keep beneficial recording performance.

In the case where solid type ink (hot-melt ink) is used as in an ink-jet recording apparatus described in Japanese Patent Application Laid-Open No.8-323,999, if the cleaning paper is not closely abutted against the head, the head surface tends to be polluted because the ink ejected out from the nozzle solidifies instantly. Particularly, in a printer in which a cassette having a roll of paper therein was mounted to the printer body, if the cassette was not mounted correctly in place, the above problem would have occurred. If the printer was used with a used up roll of paper, the problem of the ejected ink polluting the maintenance mechanism and thereabout occurred because of the absence of the cleaning paper for receiving the ejected ink. Accordingly, in a printer where a cleaning cassette having a roll of paper therein is used, it was necessary to check whether the cassette was mounted correctly in place and whether there was an adequate amount of the roll of paper, for cleaning, left in the cassette.

While various types of sensors have been conventionally used in order to detect whether an object is present within a narrow space, a sensor for detecting the roll of paper accommodated in the cassette, for example, needs to operate in a considerably narrow space. Use of a mechanical sensor in which a movable arm or the like sways so as to turn on and off a limit switch, could prove inconvenient for such a limited space because of design requirements i.e., operational space is needed for on-off actions. Further, in the case of a sensor of this type, there is a limitation concerning the direction in which the object to be detected, or the target object, approaches the sensor. More specifically, there is a risk of the target object snagging the sensor due to the sensor configuration when it approaches the sensor in certain directions. Therefore, a sensor has been needed which can operate in a narrow space such as a cassette mounting area in an ink-jet printer and still is free from the snagging problem with the mounted object.

Conventional cassettes for maintenance are formed by molding individual parts with synthetic resins etc., and bonding the parts by heat welding etc. Therefore, it has been impossible to replace only the roll of paper alone, in the cassette, with a new one. Accordingly, despite the fact that the cassette is still usable, the whole cassette with a roll of paper must be discarded when it needs to be replaced. Therefore, the replacement of a roll of paper has imposed on the user a large burden in view of cost. Further, considering environmental problems and the problems of refuse which have been drawn to people's attention recently, it is not desirable to discard the reusable cassette casing together with the roll of paper.

A first object of the invention is to provide a detector for detecting an object such as a roll of paper etc., accommodated in a cassette, whereby it is possible to check whether the cassette is mounted correctly in place and whether the object is present in the cassette.

A second object of the invention is to provide a sensor which needs less operational space for a moving piece and has a configuration such that, regardless of its arrangement, the moving piece will not snag the target object approaching from any direction.

A third object of the invention is to provide an ink-jet recording apparatus having a maintenance mechanism therefor, including: a cassette in which a roll of paper for head cleaning is accommodated; and a detector suitable for detecting the roll of paper.

SUMMARY OF THE INVENTION

In accordance with the first aspect of the invention, a detector for detecting whether an object is present in a cassette is provided, which comprises: a first movable part positioned at a first position when a cassette is not positioned at a predetermined mounting position; a second movable part positioned at a second position when an insufficient amount of the object or no object resides in the cassette; and a switch which is pressed by the first movable part when the first movable part is positioned at the first position, and is constructed so that the switch is also pressed by the second movable part when the second movable part is positioned at the second position.

In the detector of the invention, the first movable part is positioned at the first position when the cassette is not mounted correctly in place, and departs from the first position when the cassette is mounted correctly in place. The second movable part is positioned at the second position when the correctly mounted cassette has an insufficient amount of roll-like strip object or no object, and is positioned at a different site when an adequate amount of the object resides in the cassette. The switch operates and is turned on, for example, either when the first movable part resides at the first position or when the second movable part resides at the second position. Accordingly, it is possible to simultaneously check whether the cassette is correctly mounted in place and whether an adequate amount of strip is charged in the cassette. This configuration of the detector of the invention is very effective if these two conditions need to be confirmed, for example in a case where it needs to be judged whether a maintenance operation of an ink-jet printer should be started. Further, it is possible to inform the user of the timing of roll replacement when the roll of the strip has been consumed so as to leave an inadequate amount. Since this configuration uses a common switch to handle the two conditions to be checked, it is possible to reduce the number of parts for the detector and hence reduce the detector in size and manufacturing cost. In the present invention, in the case where the roll of the strip is detected by the second movable part, if the second movable part is provided so that it moves toward the core of the roll, it is possible to detect the insufficiency or absence of the strip with a much higher precision than the case where the detection of cut sheets is performed. This is because the strip wound, in a roll form, is in close contact with the core.

In the detector of the invention, the switch outputs, or stops outputting, the predetermined signal when the switch is pressed by at least by one of the first and second movable parts. Therefore, if the switch is connected to a monitor or display panel, it is possible to check whether the above two conditions are satisfied. For example, it is possible to check whether the maintenance function can be started. Further, it is also possible to control the maintenance mechanism in a printer based on the output signal.

In accordance with the second aspect of the invention, an ink-jet recording apparatus is provided, which comprises: an ink-jet recording head having a nozzle for ejecting ink; a strip for wiping the head surface in which the nozzle is formed; a cassette for accommodating the strip in a roll form; and a detector for detecting the residual quantity of the strip in the cassette, and is constructed such that the detector comprises: a first movable part positioned at a first position when a cassette is not positioned at a predetermined mounting position; a second movable part positioned at a second position when an insufficient quantity of the strip in the roll form or no strip in the roll form resides in the cassette; and a switch which is pressed by the first movable part when the first movable part is positioned at the first position, wherein the switch is also pressed by the second movable part when the second movable part is positioned at the second position.

In a cassette mounted into the maintenance mechanism in an ink-jet recording apparatus, it is necessary to make the device for detecting the presence of the strip accommodated in the cassette as compact as possible. This is because a bulky configuration of the maintenance mechanism not only makes the printing range of the ink-jet recording apparatus narrower but also makes the area where pollution occurs due to the maintenance wider. In contrast, since a detector in accordance with the first embodiment is used in the recording apparatus of the invention, it is possible to make the recording apparatus compact. Further, it is possible to reliably clean the head by ink ejection during the maintenance operation, so as to prevent the head and the apparatus interior from being polluted with ink. The present invention is particularly suitable for an ink-jet recording apparatus of a hot-melt type.

The cassette used in the ink-jet recording apparatus of the invention is particularly preferable in viewpoint of using the cassette effectively, if the strip can be attached to and removed from the cassette. The cassette, includes, for example, a shaft for taking up the strip, a fixed-rate feed roller, a casing and a cover, and the cassette can be configured so as to be disassembled by elastically deforming at least one of the components. This configuration allows the user to easily take out the used roll of cleaning paper and replace it with a new one.

In accordance with the third aspect of the invention, a detector for detecting the presence of an object by being in contact with the object within the detection area, is provided. This detector comprises: a pair of pivot arms each having a similar shaped portion to the other so as to fold into each other, and is configured so that the pair of arms are urged so as to project into the detection area when the arms are out of contact with the object; and when at least one of the arms comes in contact with the object, the pivot arms retract in such a manner that the similar shaped portions fold into each other, to thereby detect the presence of the object.

In the detector according to the third embodiment of the invention, the distal end of each movable part (pivot arm) is coupled with the distal end of other movable part by the engagement of the engaged portion with the engaging portion. In this arrangement, when the object is not within the detection area, e.g., within the cassette, the pair of the movable parts form an angled profile due to urging force from springs that are connected to the movable parts. As a result, the movable parts project into the detection range. If the object abuts any of the paired movable parts, the movable parts can move easily without snagging the object. If the movable part is provided in a form of a lever or a suspended part, the object may easily snag the movable part in some cases depending upon the direction the object approaches.

The engaging portion, when either one of the movable parts sway, causes the other movable part to sway, so that the paired movable parts retract from the detection range folding into each other. Accordingly, the moving portion which the object does not abut can also sway easily. Further, since the two movable parts each have a similar shaped portion to the other, they can be folded in an overlapping manner. Therefore, less space is needed for accommodating the movable parts. As a result, this configuration facilitates a limited to achieve a beneficial detection of the presence of the object, to be put in and taken out, such as a cassette or a roll of paper accommodated therein, from the predetermined accommodating area.

The detector of the invention, may further include an engaging portion formed of one movable part (pivot arm) so as to be coupled with the other movable part (pivot arm); and an engaged portion formed along the length of the other movable part. When at least one movable part moves whilst being in contact with the object, the other movable part will move as the engaging portion moves along the engaged portion. The engaging portion may be a projection and the engaged portion may be a groove which is formed along the length of the movable part and allows the projection to slide therein. This configuration, that is, the configuration of the engaging portion and engaged portion by providing a projection and a groove, makes the manufacturing easy and simplifies the configuration of the apparatus. Further it is possible to reduce the production cost. The detector is also excellent in durability.

When a movable part is projected into the detection area from the side face of the object's path of movement (for example, in the direction perpendicular to the loading path of the cassette), it is preferable if the movable part can move when an object abuts the movable part from either the object's direction of movement or the reverse direction thereof. In the detector of the invention, a pair of movable parts are coupled with, and overlap each other at the center of the detecting portion, and when an object comes into contact with the movable parts, they retract from the detecting area whilst the overlapping portion becomes greater. Accordingly, when the object approaches the detection range from either direction, the paired movable parts can move successfully owing to the above function. Accordingly, the detector of the invention, is markedly advantageous when it is applied to a case where an object approaches the detection area from two directions opposed to each other. Further, the configuration of the detector of the invention enhances the geometric flexibility of the arrangement of the movable parts, increasing the ease of design.

The detector of the invention may further include: a pair of pivot arms each having a pivot shaft, wherein the presence of the object is detected by detecting the rotation of one of the pivot shafts. Further, the detector may include: a lever attached to the one pivot shaft and a switch to which the lever is able to come in contact with as it rotates. Further, the arm may be S-shaped. The detector of the invention is preferably used for an ink-jet recording apparatus having a cassette in which a roll of strip for wiping the ink ejecting surface in an ink-jet head is accommodated. In this case, the pair of pivot arms may come in contact with the roll through an opening formed in the cassette.

Finally, in accordance with the invention, a detector is provided which comprises: a first pivot arm pivotally supported at one end thereof; and a second pivot arm pivotally supported at one end thereof, and is constructed so that the first and second pivot arms are disposed opposing each other in such a manner that the distal end of the first pivot arm overlaps the second pivot arm and the distal end of the second pivot arm overlaps the first pivot arm; the first pivot arm has a projection while the second pivot arm has a guide groove which is formed along the length thereof and is engaged with the projection; and when an object to be detected is out of contact with a detecting portion constituted by the first and second pivot arms, the detecting portion stays in an arched form, whereas when the object is in contact with the detecting portion, the overlapping portion between the first and second pivot arms becomes greater so that the arch becomes contracted.

DESCRIPTION OF THE PREFERRED EMBODIMENT OF THE INVENTION

Figure 1:
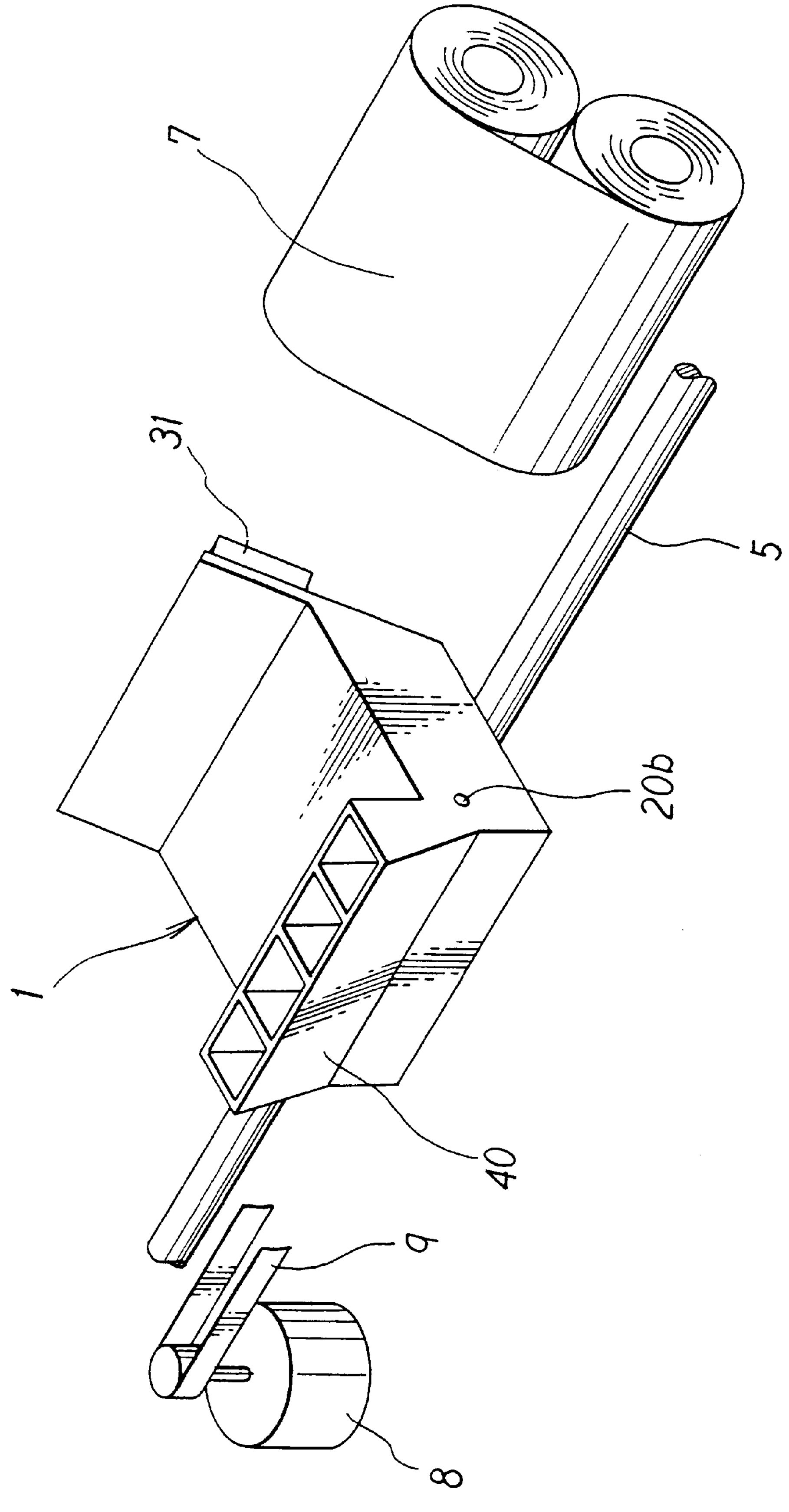
FIG. 1 is an overall view showing the essential configuration of an ink-jet printer to which the present invention is applied.

Next, the embodiment of the present invention will be described with reference to the accompanying drawings. FIG. 1 is an overall view showing the essential configuration of an ink-jet printer to which the present invention is applied. The ink-jet printer of this embodiment is a so-called hot-melt ink-jet printer, which uses ink of a solid type and ejects the melted ink. A printer of this type is disclosed in Japanese Patent Application Laid-Open No.5-193,152, which corresponds to U.S. Pat. No. 5,223,860 and is also disclosed in Japanese Patent Application Laid-Open No.8-323,999, the disclosures of which are incorporated as a part herein by reference. The assignee of this application has disclosed a head structure for use in a hot-melt ink-jet printer in Japanese Patent Application Laid-Open No.8-305,325.

As shown in FIG. 1, a head 1 of the present ink-jet printer is mounted in a carriage 3 (FIG. 8) so as to be movable along a guide shaft 5. The head 1 forms an image by ejection of ink onto a recording sheet of paper (not shown) as a recording medium, conveyed in the central area in the movable area thereof, and moves to a maintenance area in the vicinity of the right end (the right side in FIG. 1) of the guide shaft 5 before and after the image formation or at predetermined timing, whereby the head undergoes a maintenance treatment with a roll of paper 7.

Figure 2:
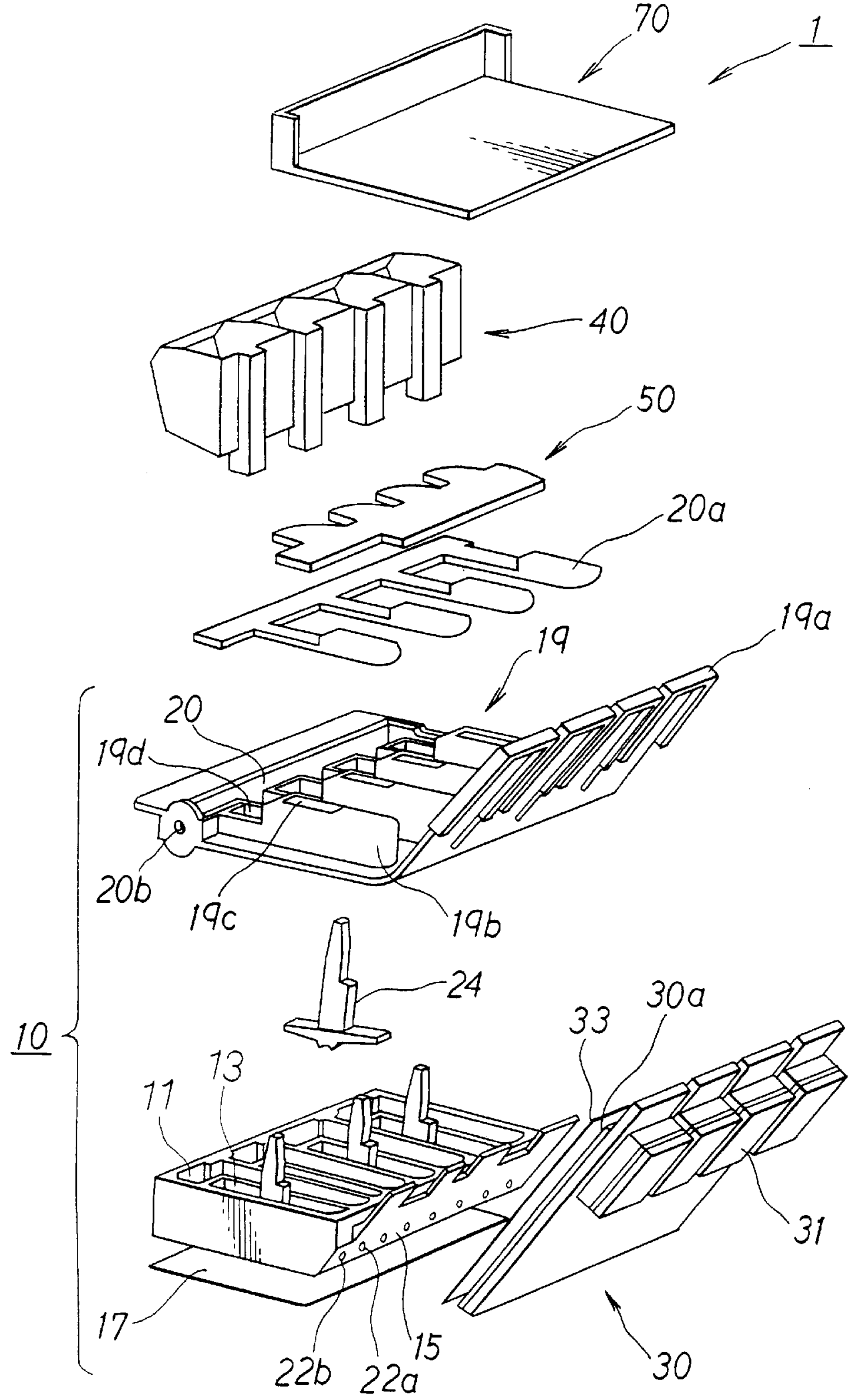
FIG. 2 is an exploded perspective view showing the configuration of the head of the ink-jet printer shown in FIG. 1.
Figure 3:
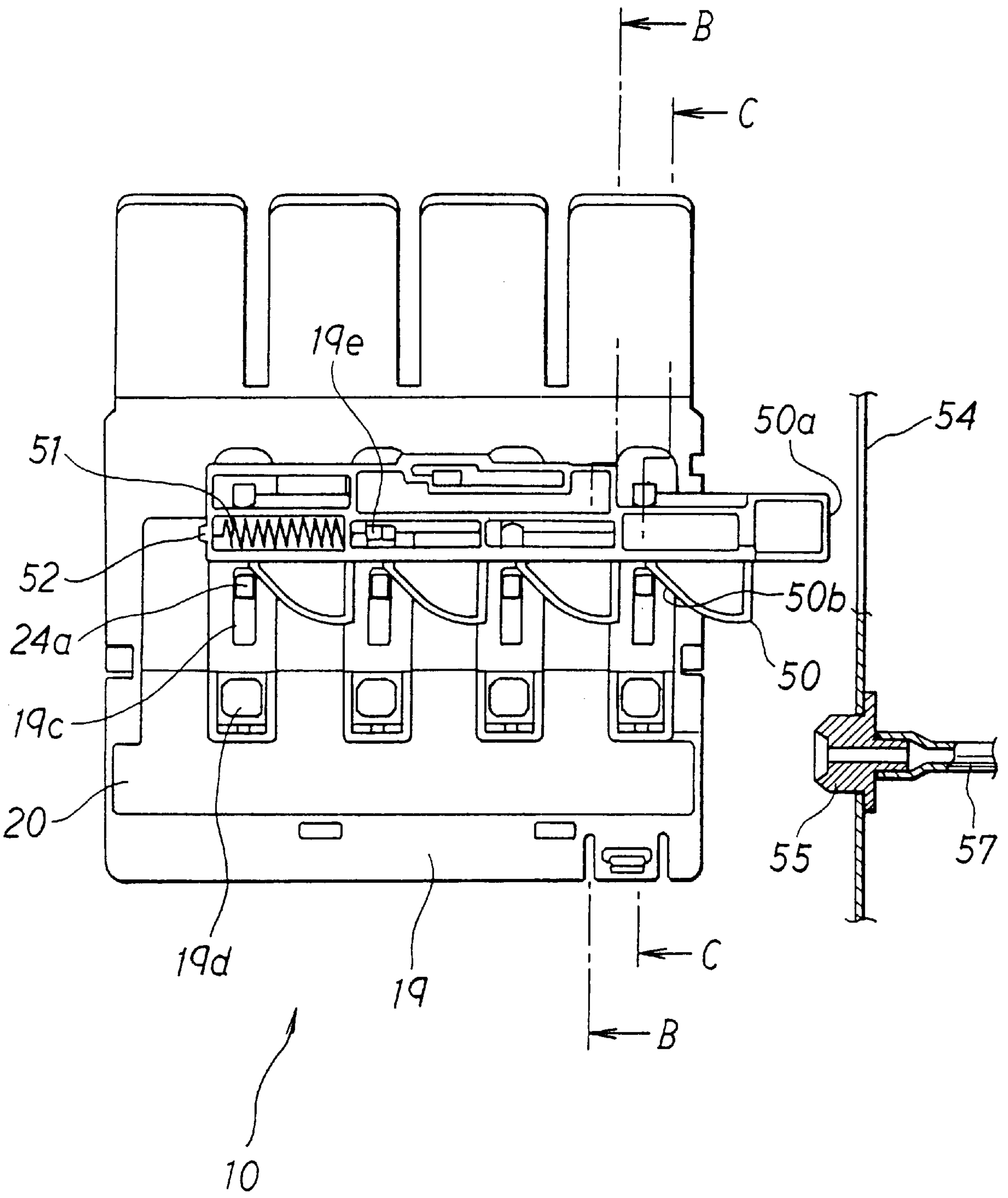
FIG. 3 is a top view showing the configuration of an ink tank of the head.
Figure 4A:
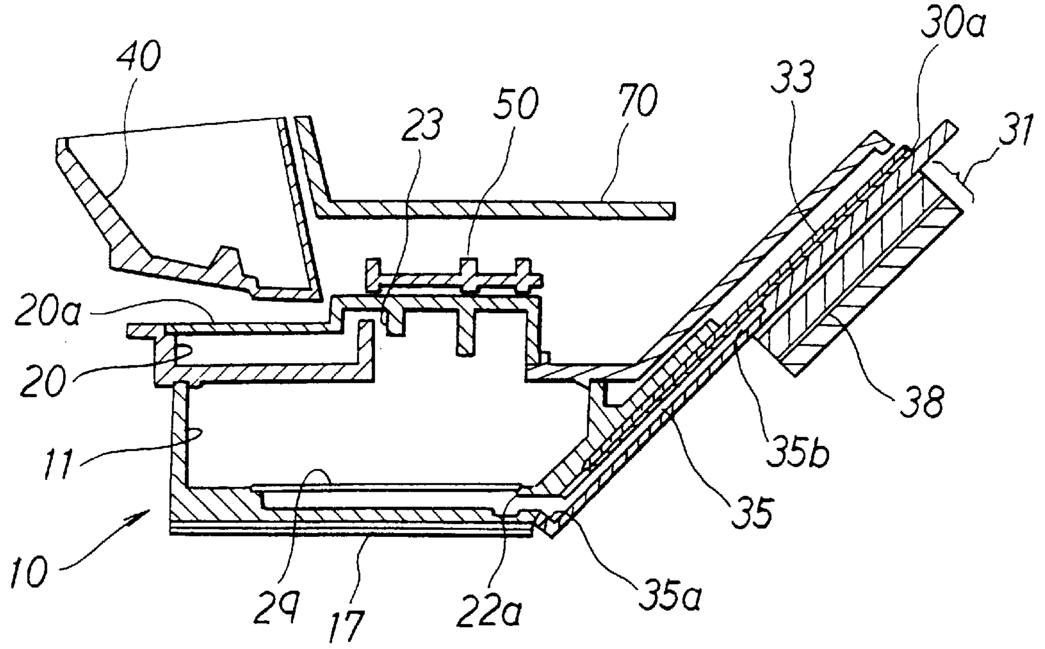
FIGS. 4A and 4B are sectional views cut across lines B—B and C—C, respectively for illustrating the ink tank.
Figure 4B:
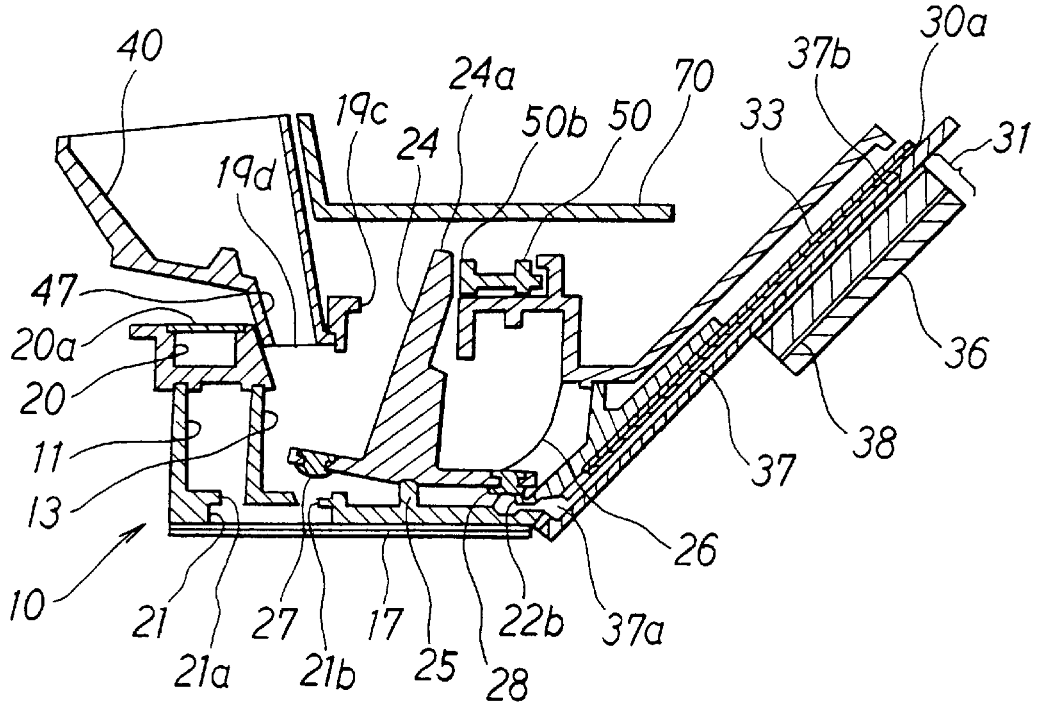

Next, the configuration of the head 1 will be described with reference to FIGS. 2 to 4. FIG. 2 is an exploded perspective view of the head 1, FIG. 3 is a top view of an ink tank 10 of the head 1, and FIGS. 4A and 4B are sectional views cut across lines B—B and C—C in FIG. 3. The configuration of the head 1 is described in detail in Japanese Patent Application No.8-305,325.

The head 1, as shown in FIG. 2, comprises the ink tank 10, a front panel 30, a melting tank 40, a cam 50 and a control board stage 70. The ink tank 10 includes a front portion 15 which is inclined to have the front panel 30 attached thereto, four sets of main chambers 11 and sub-chambers 13 for holding four colors of hot melted ink (which may be also referred to simply as ink) for color output (yellow, magenta, cyan and black), an ink tank top cover 19, and an ink tank heater 17 attached to the undersurface of the ink tank 10. Further, as shown in FIG. 4B, each set of main chambers 11 and sub-chambers 13 in the ink tank 10 has a communication passage 21 which opens downward, at the bottom on the rear side of the ink tank 10.

The main chamber 11 has an L-shape configuration when viewed from the top as shown in FIG. 2, and has a main chamber inlet 21*a* (FIG. 4B) that is connected to the communication passage 21, a main chamber outlet 22*a* (FIG. 4A and FIG. 2) that is connected to the front panel 30, and a filter 29 (FIG. 4A). The filter 29 is one produced by sintering fibers of stainless steel into a sheet-like form, and then pressing it so that fibers are complexly bent and overlapped forming channels of a spatial structure (for example "Tommyfilec SS" (trade name): (stainless steel sintered sheet) a product of Tomoegawa Paper Co., Ltd.).

The sub-chamber 13 comprises a sub-chamber outlet 21*b* connected to the communication passage 21, a sub-chamber inlet 22*b* communicating with the front panel 30, and as shown in FIGS. 2 and 4B, an approximately inverted T-shaped valve control lever 24 for opening either sub-chamber outlet 21*b* or sub-chamber inlet 22*b* while closing the other.

The valve control lever 24 is die-cast from aluminum alloy, and as shown in FIG. 4B, is mounted so that it can be supported pivotally at a lever seat 25 provided between the sub-chamber outlet 21*b* and sub-chamber inlet 22*b*. The valve control lever 24 has pressure valves 27 and 28. In this arrangement, the lever 24 is urged by a leaf spring 26 under normal conditions so that the pressure valve 28 seals the sub-chamber inlet 22*b*. Here, the pressure surface of the pressure valve 27 is of a spherical form while the socket rim of sub-chamber outlet 21*b* corresponding to the valve 27 is tapered. The pressure surface of the pressure valve 28 is flat while the socket rim of the sub-chamber inlet 22*b* corresponding to the valve 28 is of an annular projected form. The pressure valves 27 and 28 are made from silicone rubber having a Shore hardness of about 40° with a heat-resistance temperature of about 200° C.

The ink tank top cover 19 has, as shown in FIG. 2, a front panel cover portion 19*a* which fits the shape of the front panel 30, a sub-chamber cover portion 19*b* for covering sub-chambers 13, slots 19*c* for exposing upper ends 24*a* of valve control levers 24, ink charging ports 19*d* through which hot-melt ink is supplied from the melt tank 40 to the sub-chamber 13, an air chamber 20 for sending compressed air from an aftermentioned pump 160 to each main chamber 11, a passage hole 20*b* on the side wall penetrating from the air chamber 20 to the side surface of the ink tank 10, and an air chamber lid 20*a* for sealing the air chamber 20. Here, the air chamber 20 of the ink tank top cover 19 has a passage hole 23 which is connected to each main chamber 11, as shown in FIG. 4A.

The front panel 30, as shown in FIG. 2, has four nozzle heads 31 on the front side thereof, and the rear side of the front panel 30 is provided with outward channels 35 (FIG. 4A) which each establish the communication between a corresponding main chamber 11 and nozzle head 31, and inward channels 37 (FIG. 4B) which each establish the communication between a corresponding nozzle head 31 and sub-chamber 13. Further, as shown in FIG. 2 and FIGS. 4A and 4B, a cover panel 30*a* is provided on the rear side of the front panel 30 so as to cover the outward and inward channels 35 and 37. Further, a front panel heater 33 is attached to the rear side of this cover panel 30*a*. As shown in FIGS. 4A and 4B, provided at the joint from each main chamber 11 to the corresponding outward channel 35 is an outward entrance 35*a* while an outward exit 35*b* is provided at the joint from the outward channel 35 to the corresponding nozzle head 31. Further, an inward entrance 37*b* is provided at the joint from each nozzle head 31 to the corresponding inward channel 37 while an inward exit 37*a* is provided at the joint from the inward channel 37 to the corresponding sub-chamber 13.

The nozzle head 31 has a piezoelectric crystal-element 38, and ejects ink supplied through the outward exit 35*b*, in accordance with the change in the volume of the piezoelectric crystal-element 38. Further, ink supplied to the nozzle head 31 can be circulated to the sub-chamber 13 by way of the inward entrance 37*b* and the inward channel 37.

The cam 50 is attached over the ink tank top cover 19 so that it can slidably move in the left and right directions in FIG. 3, with the portion around an abutment face 50*a* projected to the right from the boundary of the ink tank top cover 19. The cam 50 has four cam surfaces 50*b*, and is urged by a spring 51 which is tensioned between a projection 52 provided at the left end of the cam 50 and a projection 19*e* provided in the ink tank top cover 19, so that the cam surfaces 50*b* are kept out of contact with the upper ends 24*a* of valve control levers 24, under normal conditions.

The melt tank 40 is partitioned into four compartments for black, cyan, magenta and yellow, as shown in FIG. 2. Each compartment is provided in a box-like form with a top opening so as to be charged with solid ink. Provided the lower part of the each compartment of the melt tank 40 is a conduit 47 for leading the molten ink to the sub-chamber 13.

The melt tank 40 is changed with solid ink by means of an unillustrated ink charger. The melt tank 40 has a heater, which melts the solid ink so that the ink can be supplied to the sub-chamber 13 of the ink tank 10 through the conduit 47. Further, the control board stage 70 has an unillustrated control board, and is attached to the upper part of the head 1.

Figure 14:
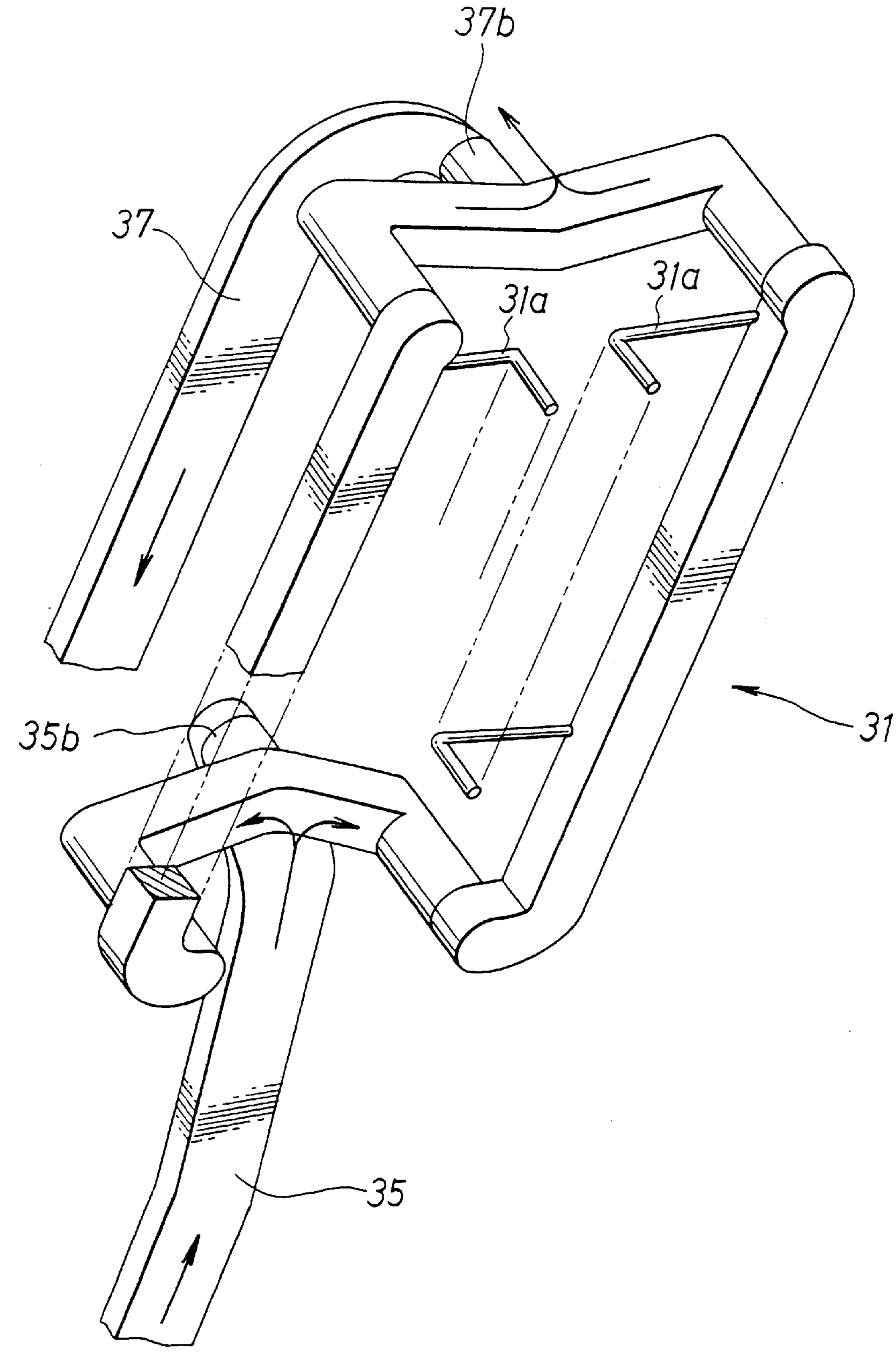
FIG. 14 is an illustrative view showing the structure of flow channels in a nozzle head.

In the head 1 thus configured, the control board stage 70 drives the heaters 17, 33 etc. so as to keep the solid ink in a molten state so that ink is ejected by driving the piezoelectric crystal-element 38 in accordance with the print data etc., as already mentioned. When the ink head 1 has moved to the aforementioned maintenance area, a purging operation is performed in the following manner. Purging is an operation of pressurizing the ink inside the front panel 30 and the nozzle head 31 from the main chamber side 11 to displace the ink with air bubbles and dust, which will cause malejection. More specifically, those within the nozzle portion (designated at 31*a* in FIG. 14) are displaced outside from the nozzle together with the ink while those inside the front panel 30 are pushed into the sub-chamber 13, to thereby fill each space with clean ink which has been filtered by the filter 29. Contamination of the ink with air bubbles occurs when ink, which was once molten ink but has solidified due to reduction in head temperature after the power has been deactivated, again melts upon re-activation of the power. As to dust, it may enter from the nozzle.

Once the head 1 has moved to the maintenance area, the abutment face 50*a* of the cam 50 is pushed against a frame 54 of the printer body (see FIG. 3) while a hollow, cylindrical cap 55 formed in the frame 54 covers the passage hole 20*b*. Then, the cam 50 relatively slides to the left over the ink tank top cover 19, the cam surfaces 50*b* push respective upper ends 24*a* of valve control levers 24, in the downwards direction in FIG. 3. Accordingly, each valve control lever 24 sways pivotally at the lever seat 25, so as to release the pressure contact between the pressure valve 28 and the sub-chamber inlet 22*b* whilst a further sway establishes a pressure contact between the pressure valve 27 and sub-chamber outlet 21*b*, whereby the sub-chamber inlet 22*b* is opened while the sub-chamber outlet 21*b* is sealed.

At this moment, since the cap 55 has covered passage hole 20*b*, compressed air is sent from an aftermentioned pump 160 via a pipe 57 which is connected to the hollow of the cap 55 so as to push out air bubbles as described below. The sending of compressed air increases the pressure inside the main chamber 11. Since the sub-chamber outlet 21*b* is sealed while the sub-chamber inlet 22*b* is open, the ink containing air bubbles from the main chamber 11 is filtered of air bubbles and dust by the filter 29, to reach the nozzle head 31 passing through main chamber outlet 22*a*, the outward entrance 35*a*, the outward channel 35 and the outward exit 35*b*. Then, the flow of the ink branches into two paths, i.e., one which is discharged (ejected) to the outside from the nozzle portion 31*a* and the other which is directed to the inward entrance 37*b* side. The flow ratio between the two is determined depending upon the settings of the flow resistance of the outward channel 35, inward channel 37 and nozzle portion 31*a*. The ink of the path on the inward entrance 37*b* side is sent to the sub-chamber 13 by way of inward channel 37, inward exit 37*a* and sub-chamber inlet 22*b*. Thus, the ink containing air bubbles inside the outward channel 35, nozzle portion 31*a* and inward channel 37 is replaced by clean ink.

Thereafter, the head 1 is moved to the left so as to set the abutment face 50*a* away from the frame 54, whereby the upper ends 24*a* of the valve control levers 24 are released from being pressed by cam surfaces 50*b*. At this moment, each valve control lever 24 is moved pivotally at the lever seat 25 by the urging force of the leaf spring 26, whereby the sub-chamber inlet 22*b* is sealed while the sub-chamber outlet 21*b* is opened. Thereby, the ink which has been forced to enter the sub-chamber 13 through purging is fed back to the main chamber 11 from the communication passage 21 so that the level of the liquid surface in the main chamber 11 can be equalized with that in the sub-chamber 13.

Figure 5:
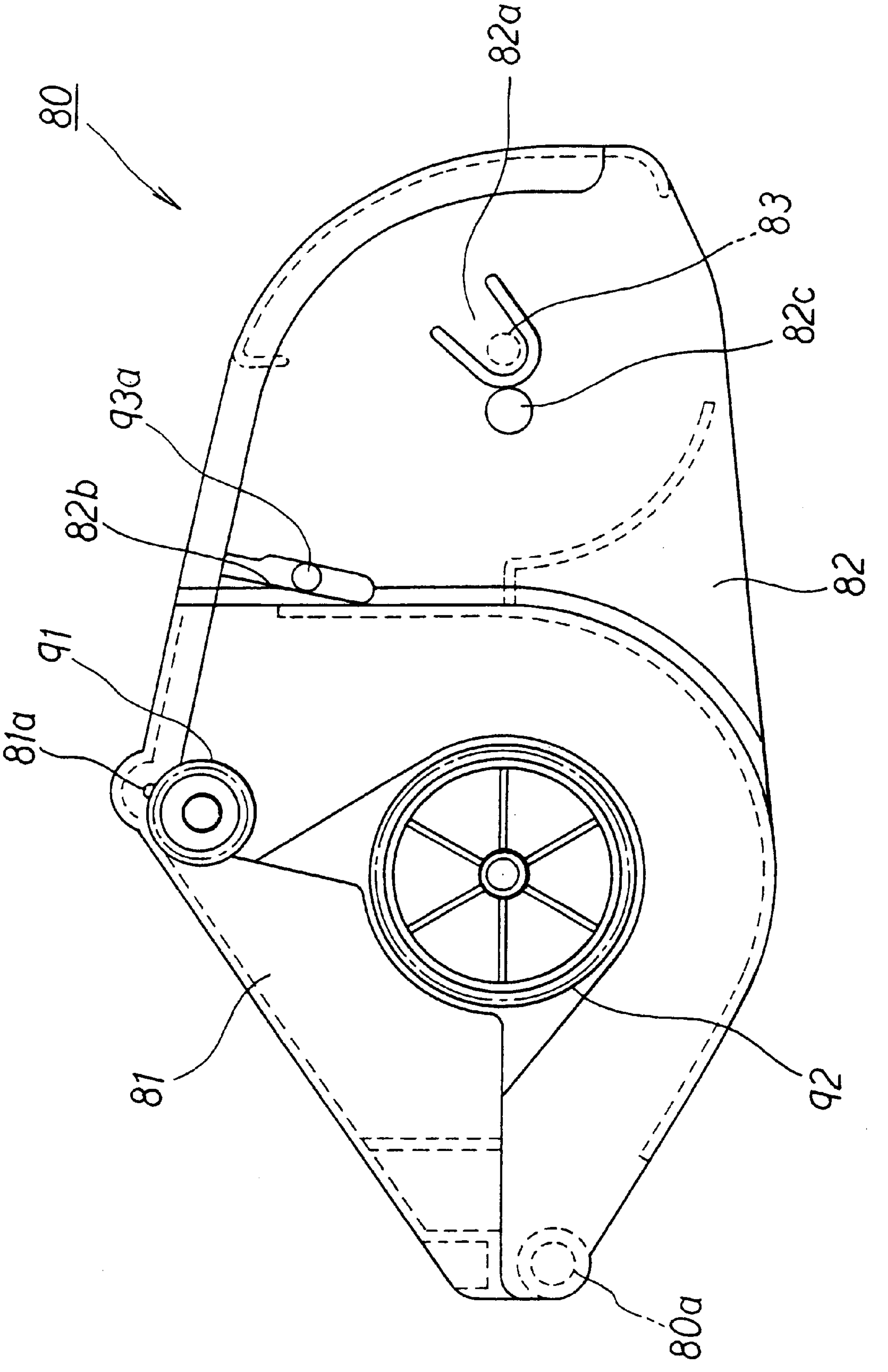
FIG. 5 is a left-side view showing the configuration of a cassette for head maintenance.

When the aforementioned purging is performed, part of the ink is forced to be ejected from the nozzle surface 36 of the nozzle head 31. In the present ink-jet printer, since the roll of paper 7 is disposed in the maintenance area, the nozzle surface 36 is wiped by this roll of paper 7 whilst receiving the ejected ink. Next, the configuration of a maintenance unit 100 which feeds the roll of paper 7 and presses it against the nozzle head 31, i.e., the function of the maintenance mechanism, will be described. In the beginning, since the roll of paper 7 is a consumable item, it is held by a cassette 80 shown in FIGS. 5 and 6, and either the whole the cassette 80 or only the roll of paper 7 is replaced when it is used up. Distribution to the user is done either as the cassette 80 or by a set of the rolls of paper 7 for refill, which can be selected at the user's convenience. FIG. 5 is a left-side view showing the configuration of the cassette 80, and FIG. 6 is a vertical sectional view of FIG. 5.

Figure 6:
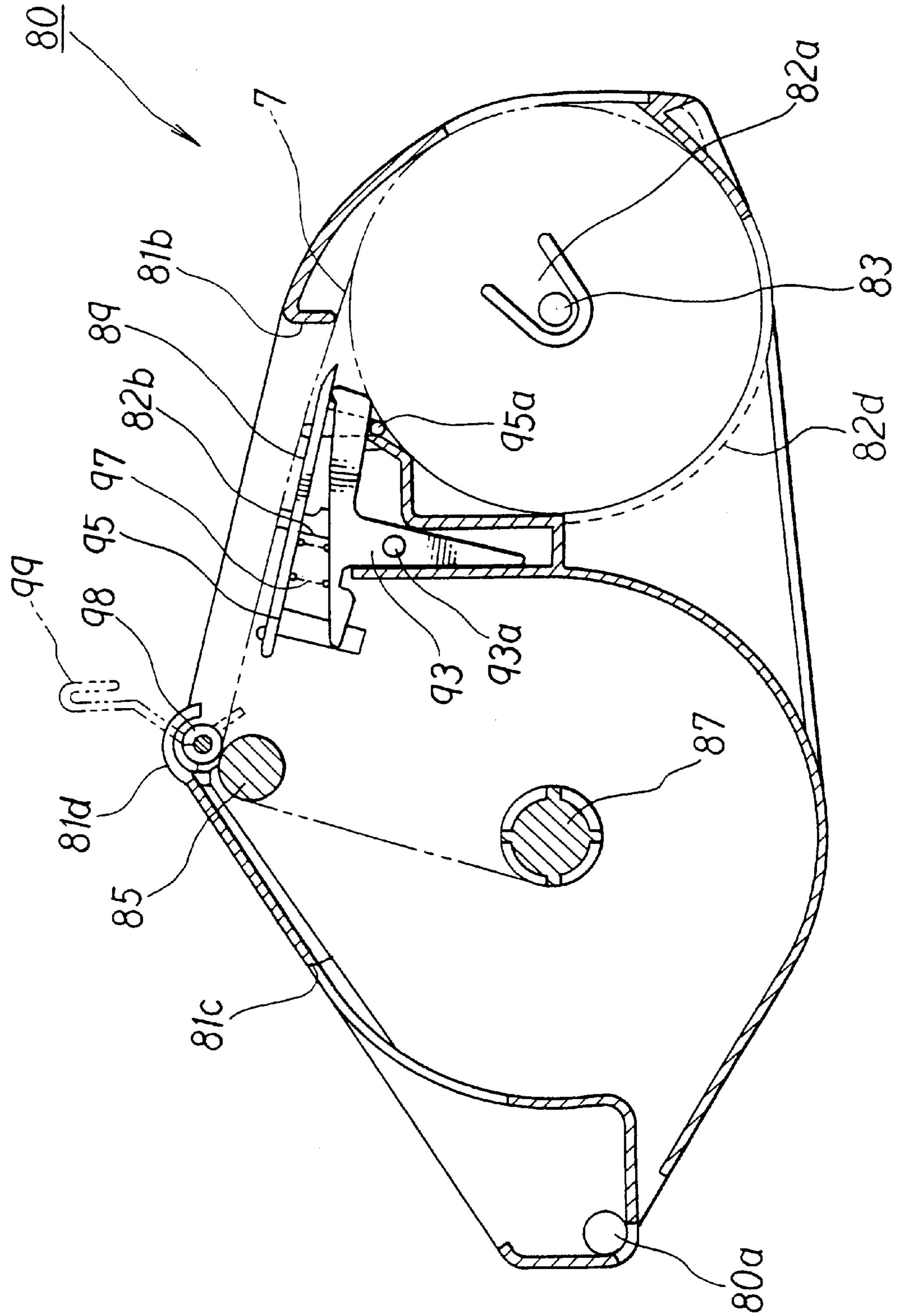
FIG. 6 is a vertical sectional view showing the configuration of the cassette shown in FIG. 5.

As shown in FIGS. 5 and 6, the cassette 80 is composed of a casing 82 and a cover 81 which can be pivoted at a hinge 80*a* in an openable and closable manner. Provided inside the casing 82 are a pin 83 set on the inner wall surface for supporting an unused roll of paper 7, a fixed-rate feed roller 85 for feeding the paper from the roll of paper 7, a winding shaft 87 for taking up the fed paper from the roll of paper 7 and a pressing plate 89 for pressing a stretch of paper 7 against the nozzle head 31. The side wall of the casing 82 in which the pin 83 is formed has an approximately U-shaped cutout to form an sectioned piece 82*a*. This piece 82*a* can easily flex to the exterior from the casing side wall, owing to its elasticity. Accordingly, the pin 83 can be displaced outward when a roll of paper 7 is mounted and then can revert itself back to the original position due to its elasticity and fit into the hollow core (which is a simple hollow in the case of this embodiment where the roll of paper 7 is a so-called 'coreless' type having no core roll, whereas, this is a paper core if the roll of paper has a paper core) of the roll of paper 7, to thereby support the roll of paper 7. The rotary shaft of the fixed-rate feed roller 85 and the winding shaft 87 are projected on the both left and right sides, with gears 91 and 92 fixed respectively on the outside of the left face of the casing 82.

Further, as shown in FIG. 5, formed on either side wall of the casing 82 is a slot 82*b* which is approximately perpendicular to the conveying path of the strip of paper 7 from the circumference of the pin 83 to the fixed-rate feed roller 85. Fitted into the slots 82*b* is a pin 93*a* which is formed in a support 93 of the pressing plate 89. The pressing plate 89 comprises this support 93, a plate 95 connected to the support 93, pivotally by a pair of pins 95*a*, a compression coil spring 97 urging the plate 95 further away from the support 93. Projected on either side of the casing 82*c* is a guide pin 82*c* as shown in FIG. 5.

A nip roller 98 is provided inside the cover 81 mounted in elliptical holes 81*a* formed in the cover 81. This nip roller 98 receives the pressure from a leaf spring 99 provided for the upper frame of the printer body and is pressed against the fixed-rate feed roller 85 to nip the strip of paper 7 therebetween. Further, formed in the upper part of the cover 81 (in the upper portion in FIGS. 5 and 6) is an opening 81*b* for allowing the strip of paper 7 to be projected outside and an opening 81*c* for allowing the detection of the quantity of the wound roll of paper 7 on the winding shaft 87, while an opening 82*d* for allowing an aftermentioned sensor 110 to detect the presence of the roll of paper 7 remaining on the pin 83 side is provided in the lower part of the casing 82. There also, formed on the boundary of the opening 81*b*, is a notch 81*d* for allowing the leaf spring 99 to pass therethrough.

Figure 15:
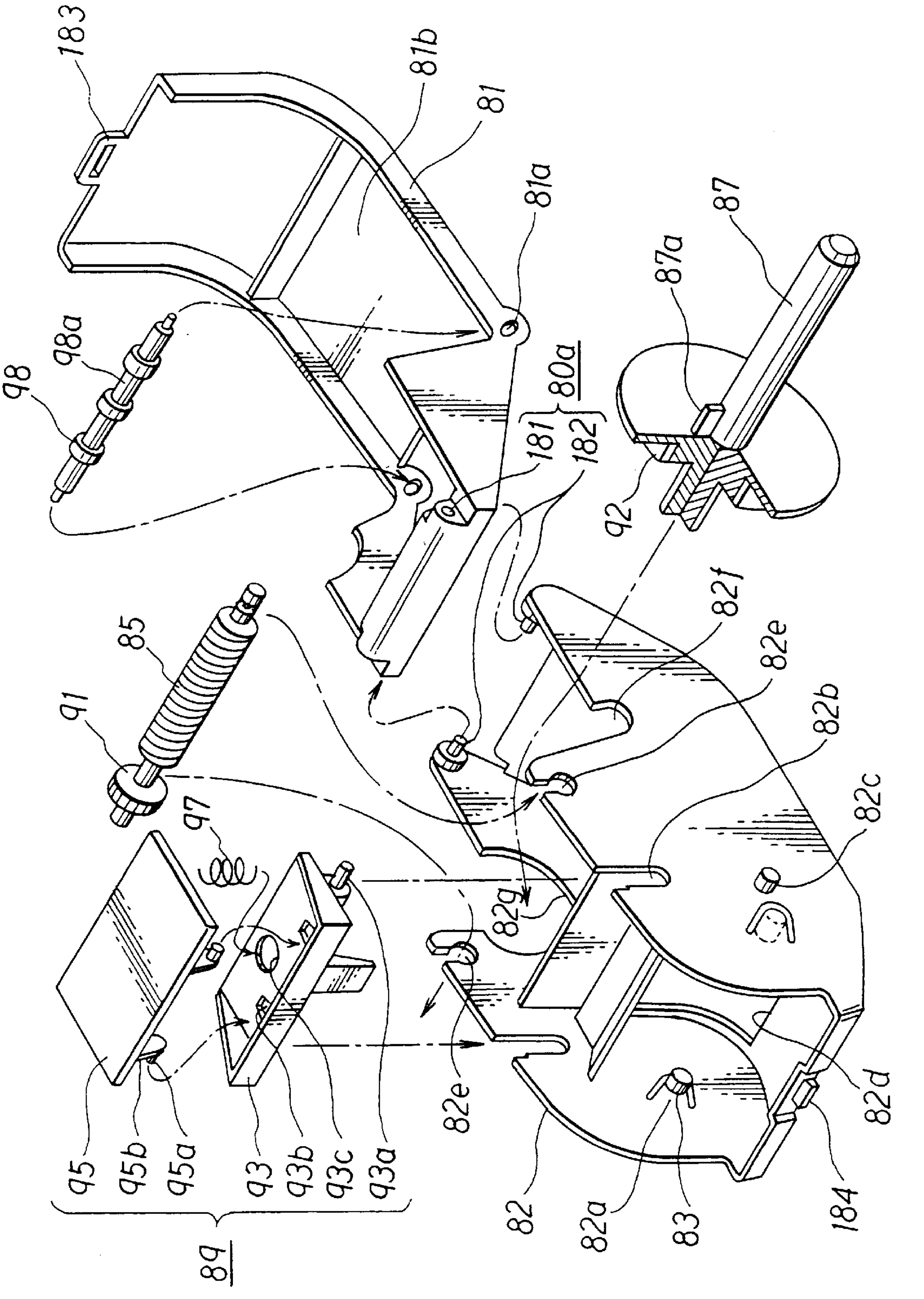
FIG. 15 is an exploded perspective view showing the cassette shown in FIGS. 6 and 7.

Referring to FIG. 15, the cassette 80 will be described in further detail. FIG. 15 is an exploded perspective view showing the cassette 80 with the cover 81 removed from the cassette casing. The cassette 80 is assembled, as mentioned above, of the cover 81, casing 82, fixed-rate feed roller 85, winding shaft 87, support 93, plate 95, compression coil spring 97 and nip roller 98. Here, all the parts except the compression coil spring 97 are molded from synthetic resins. As examples of synthetic resin for these parts, PS (polystyrene) is used for the cover 81 and casing 82, ABS is used for the winding shaft 87, PC (polycarbonate) is used for the support 93 and plate 95, POM (polyoxymethylene) is used for the nip roller 98. Formed over the periphery of the fixed-rate feed roller 85 is an elastic layer composed of sponge, rubber or the like. These parts can be configured so as to be disassembled into individual parts as shown in FIG. 15, without using any tools.

Illustratively, formed on the left and right at the rear end of the cover 81 are round bores 181 while cylindrical pins 182 projected from the left and right inner walls are formed at the rear end of the casing 82. The side walls of casing 82 are elastically deformed at their rear end so that the pins 182 set on both sides fit into respective round bores 181, forming the hinge 80*a*. In this way, the cover 81 can be connected to the casing 82 in an openable and closable manner. The cover 81 has an rectangular hole 183 at its front end while the casing has a projection 184 at its front end. As the cover 81 is closed with respect to the casing 82, the part with the rectangular hole 183 is once elasticity deformed outward and then reverts back to thereby become engaged with the projection 184. This engagement keeps the cover 81 from being opened by any naturally arising external force.

The pins 95*a* of the pressing plate 89 are formed on a pair of support tabs 95*b* projected from the undersurface of the plate 95. When these support tabs 95*b* are elastically deformed inward and the pins 95*a* are inserted into a pair of rectangular holes 93*b* provided in the support 93 and revert back, the tabs 95*b* are connected to the support 93, pivotally on pins 95*a*. In this arrangement, the compression coil spring 97 is inserted to a hollow 93*c* formed on the upper surface of the support 93, to complete the pressing plate 89. Each slot 82*b* in the casing 82 opens, but becomes narrowed, at the upper edge of casing 82. This configuration allows the pressing plate 89 to be attached to the casing 82 by squeezing the pins 93*a* of the support 93 down into the slots 82*b*.

The fixed-rate feed roller 85 is formed integrally and coaxially with the gear 91 and is supported rotatably by a pair of bearing holes 82*e* provided in the casing 82. Each bearing hole 82*e* opens, but becomes narrowed, at the upper edge of the casing 82, so as to allow the fixed-rate feed roller 85 with gear 91 to be attached to the casing 82 by squeezing the shaft of the fixed-rate feed roller 85 down into the bearing holes 82*e*. The winding shaft 87 is formed integrally and coaxially with the gear 92 and is mounted from above into bearing holes 82*f* and 82*g* which are formed in casing 82. Thereafter, when the cover 81 is closed, the winding shaft 87 with gear 92 is held between bearing hole 82*f*, 82*g* and lower edge of the cover 81 so that it can be supported rotatably. Further, the nip roller 98 has a flexible shaft 98*a*. This shaft 98*a* is deformed so that both ends can be inserted into elliptical holes 81*a* from the inner sides to thereby attach nip roller 98 to the cover 81.

In this way, the cassette 80 of this embodiment can be easily assembled from, and disassembled into, individual parts without using any tools. Accordingly, when the roll of paper 7 has been used up from the maintenance operation, it is possible to easily reuse the cassette 80 by refilling with a roll of paper 7 in the following manner.

Figure 7:
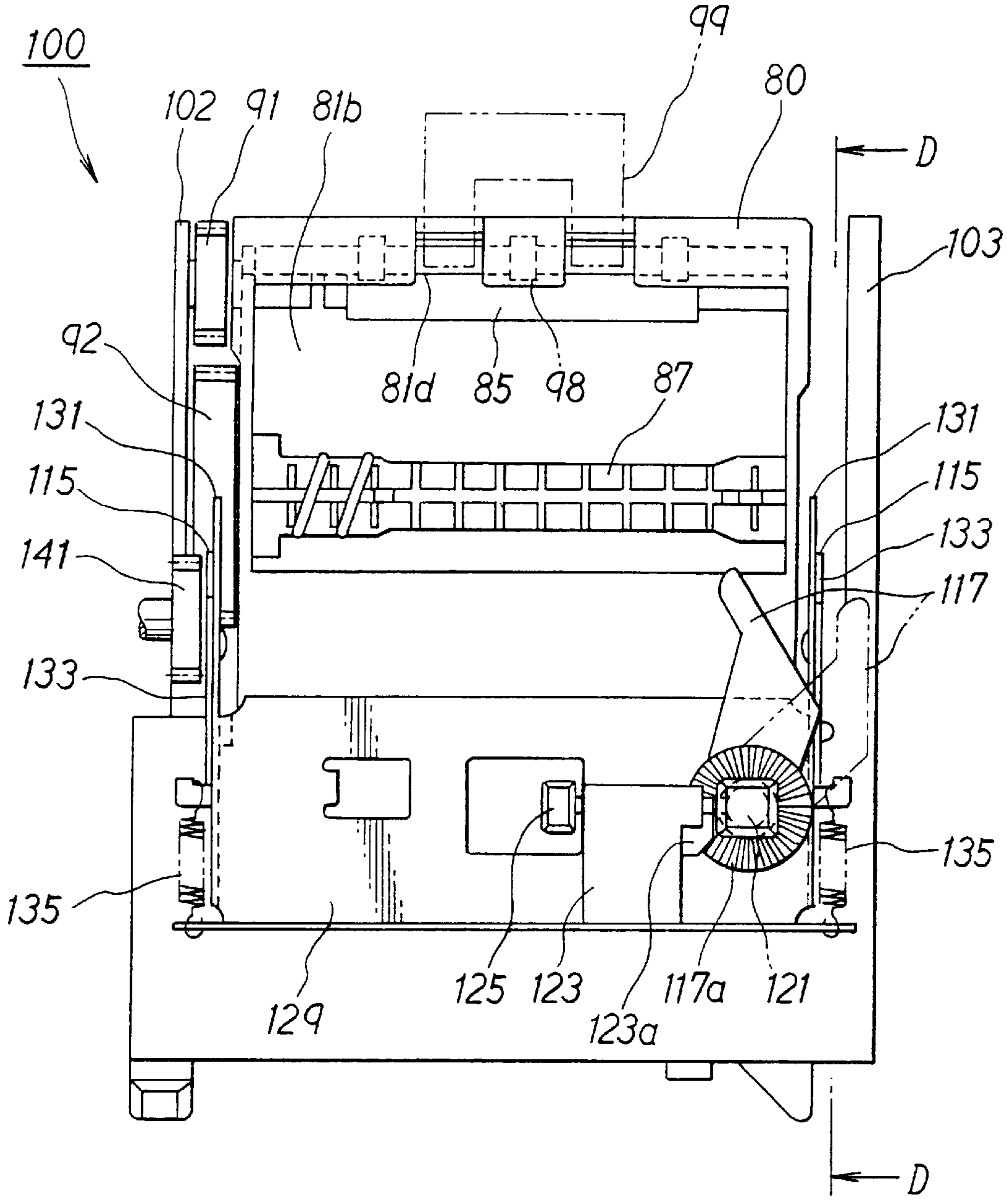
FIG. 7 is a front view showing the configuration of a maintenance unit when the cassette shown in FIG. 5 is mounted.
Figure 8:
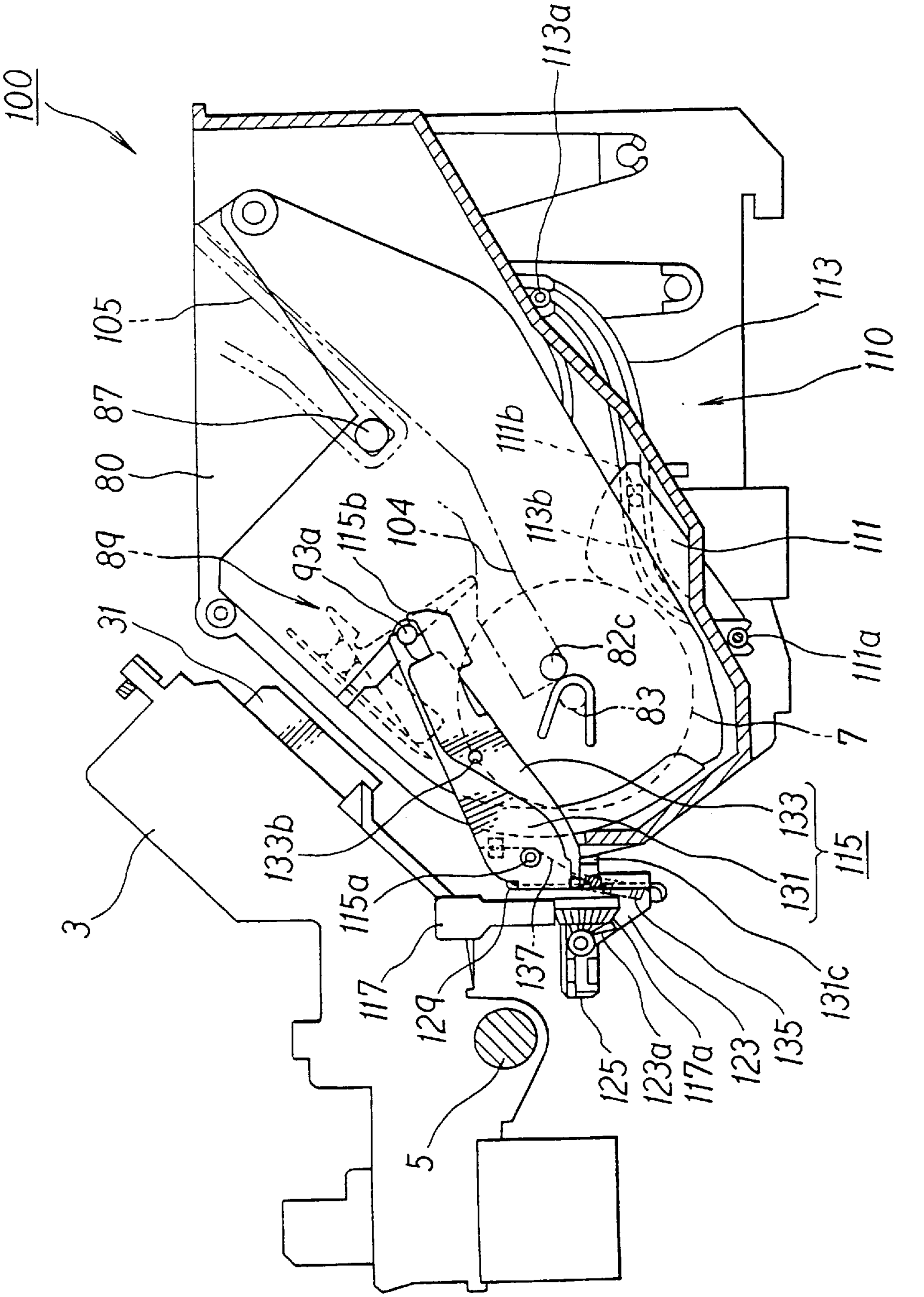
FIG. 8 is a sectional view cut across a line D—D showing the configuration of the maintenance unit.
Figure 9:
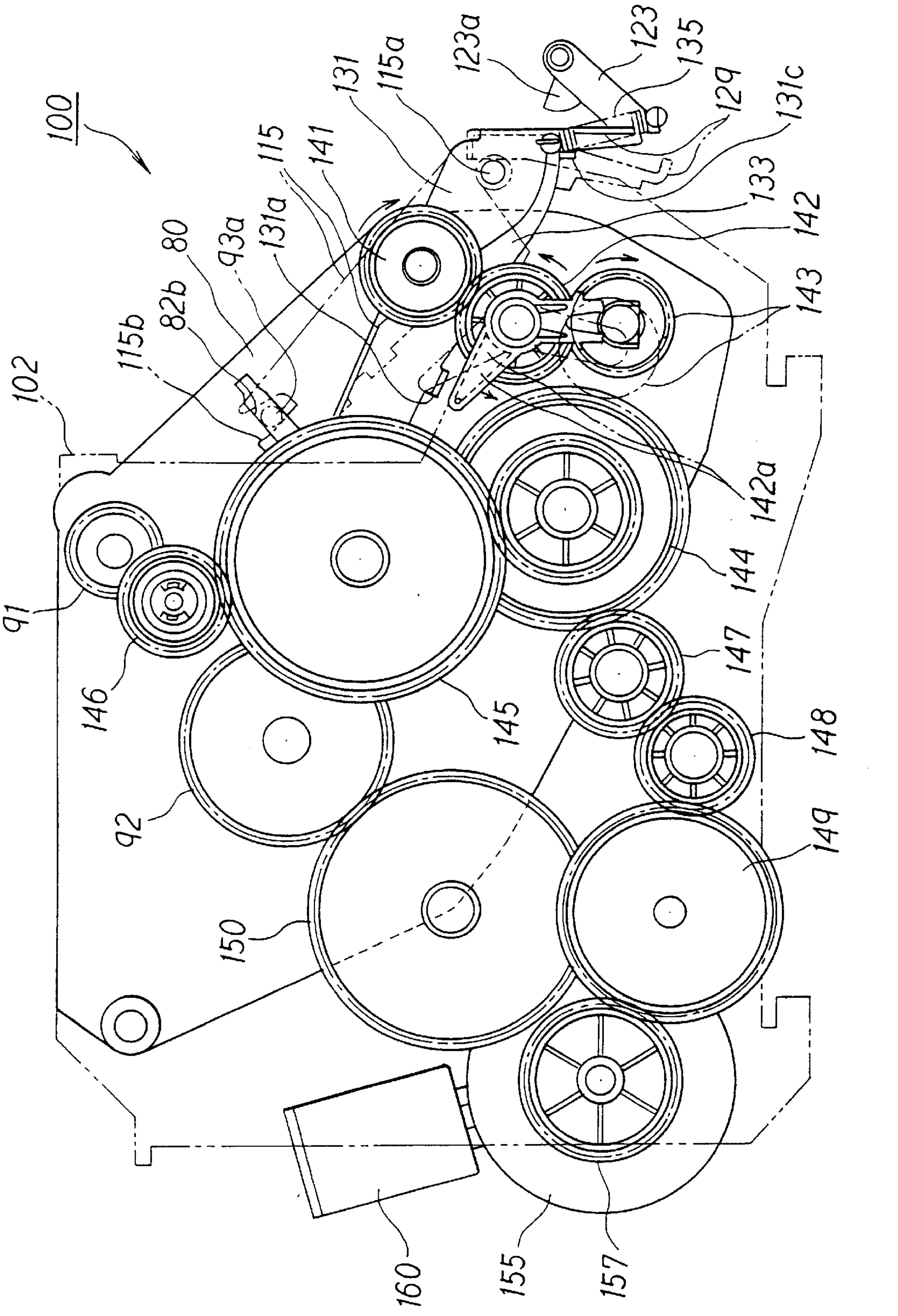
FIG. 9 is a left-side view showing the configuration of the maintenance unit.

Referring next to FIGS. 7 through 9, description will be made of the configuration of the maintenance unit 100 when the cassette 80 has been set. For simplifying the illustrations, the pressing plate 89 is omitted in FIG. 7, and the side frame 102 is depicted with dashed line in FIG. 9. As shown in FIGS. 7 and 8, the maintenance unit 100 has a pair of side frames 102 and 103. Each side frame 102 and 103 has guides 104 and 105, guiding the pin 82*c* and the winding shaft 87, respectively (FIG. 8). When the cassette 80 is mounted along the guides 104 and 105, movable parts 111 and 113 of the sensor 110 disposed below those guides pivot about shafts 111*a* and 113*a*, respectively. When the cassette 80 is completely set in, the movable part 111, on the carriage 3 side, is held inside the cassette 80 by the pin 83 while abutting the roll of paper 7 exposed to the opening 82*d* of the cassette 80. The sensor 110 detects the presence or absence of the roll of paper or the residual quantity of it based on the deflected state of the movable part 111. The configuration of the sensor 110 will be detailed later.

Both ends of the pin 93*a* of the pressing plate 89 are projected from both sides of the cassette 80, and are engaged with the distal ends of a pair of arms 115 which can pivot about a point in the front side (the side opposing the carriage 3: the positional relationship of the cassette 80, i.e., the front and rear sides thereof, will be referred to hereinbelow in the same manner) of the maintenance unit 100. Provided at a further front position of the maintenance unit 100 is a lever 117 which pivotally moves when the carriage 3 abuts it. With the sway of this lever 117, the pressing plate 89 is projected in the following way.

As shown in FIG. 7, the lever 117 is disposed pivotally about an axle 121 which projects towards the front of the maintenance unit 100. When the carriage 3 is moved to the aforementioned maintenance area, the lever 117 is pushed by the carriage 3 and rotated clockwise up to a position indicated by the two-dot chain line in FIG. 7. The lever 117 has an integrated bevel gear 117*a* supported about the axle 121. This bevel gear 117*a* meshes another bevel gear 123*a* which is integrated with a pressing piece 123. This pressing piece 123 is installed rotatably between the distal end of the axle 121 and the distal end of an axle 125 which is projected in parallel with the axle 121. Therefore, with the above movement of the lever 117, the pressing piece 123 rotates counterclockwise in FIG. 8 (clockwise in FIG. 9). Here, in order to clearly depict the configuration of the pressing piece 123, the axle 121 has been abbreviated in FIG. 8 and the axles 121 and 125 and lever 117 have been omitted.

Figure 13:
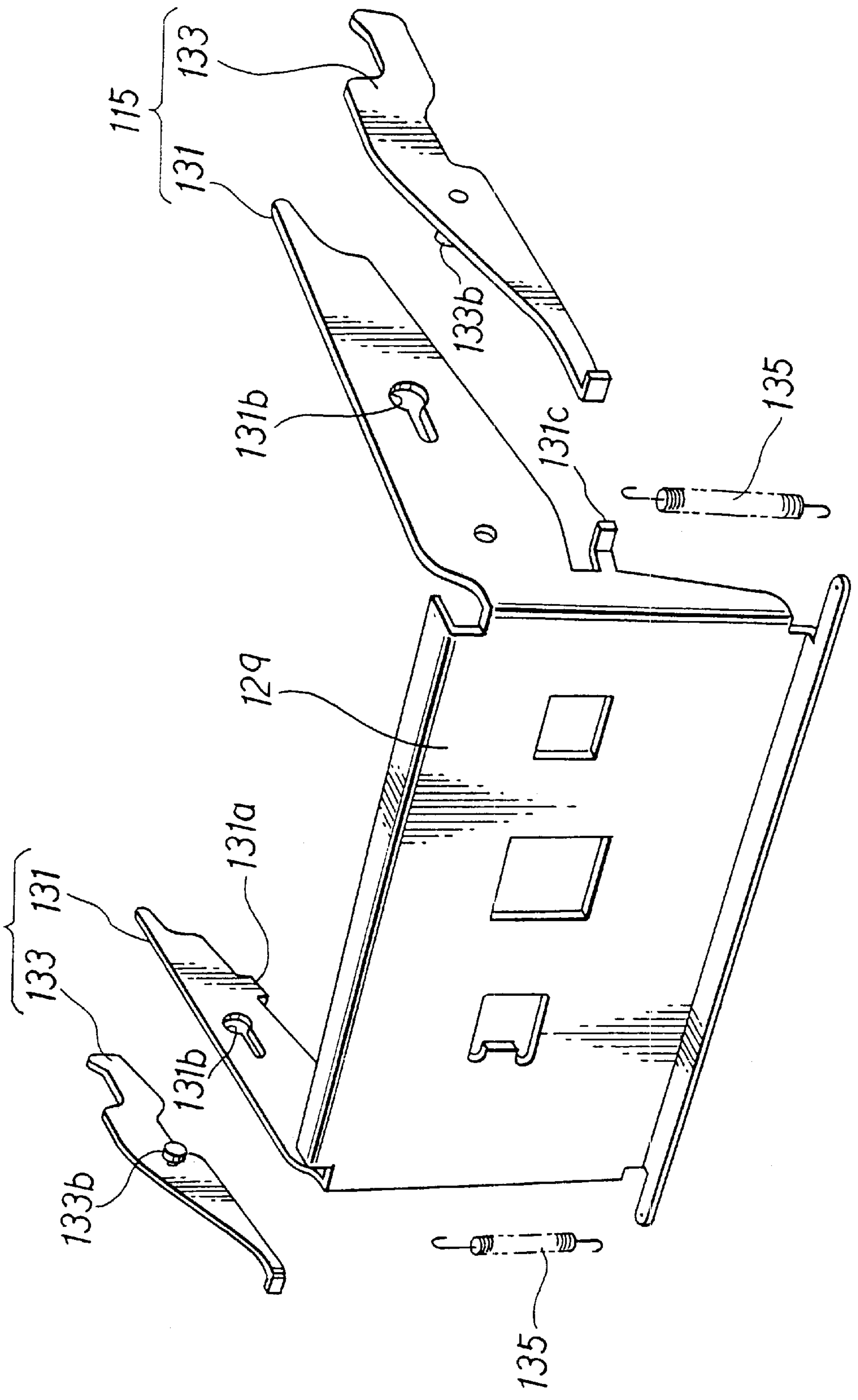
FIG. 13 is an exploded perspective view showing the configuration of an arm of the maintenance unit.

As shown in FIG. 13, an iron plate 129 is connected to the front end of paired arms 115. The distal end of the pressing piece 123 presses the iron plate 129 as it sways, as above. As shown in FIGS. 8, 9 and 13, each arm 115 includes an upper arm 131 pivoting about an axle 115*a*, and a lower arm 133 which is pivotally supported about a stepped, crimped pin 133*b* which is fitted into the small-diametric part of a keyhole 131*b* provided in the approximate middle of the upper arm 131. The front ends of the upper arms 131 are fixed to the left and right edges of the iron plate 129 or they may be formed from an metal sheet and bent by folding. A helical tension spring 135 is extended between the front end of the lower arm 133 and the lower end of the iron plate 129. This helical tension spring 135 urges the rear end of the lower arm 133 upwards. The front side lower edge of the lower arm 133 abuts a projection piece 131*c* formed by folding at the front side lower edge of the upper arm 131. In this state, the rear ends of the upper arm 131 and lower arm 133 are shaped so as to create a gap 115*b* which can have the pin 93*a* just fitted therein. The helical tension spring 135 also functions to keep the stepped, crimped pin 133*b* of the lower arm 133 from moving from the small-diametric side to the large diametric side within the keyhole 131*b* of the upper arm 131, thus maintaining the mated condition.

When the iron plate 129 is pushed by the pressing piece 123, the whole arms 115 pivot about respective axles 115*a* in a counterclockwise direction in FIG. 8, so that the pressing plate 89 is projected together with a stretch of paper 7. When the pressing plate 89 abuts the nozzle head 31 etc., with a stretch of paper 7 in between, the lower arms 133, whilst opposing the urging force of the helical tension springs 135, pivot about respective stepped, crimped pins 133*b* in a clockwise direction in FIG. 8, to thereby reduce the impact upon abutment. Further, if any part had some dimensional error or variation etc., due to manufacture or assembly, or in order to improve the print quality, the distance of the nozzle surface 36 from the platen had been modified depending upon the type of the print paper, it is possible to urge the pressing plate 89 uniformly against the nozzle surface 36. Furthermore, when the pressing force from the pressing piece 123 is not active, the arms 115 are held at the down position by the action of a leaf spring 137 (FIG. 8).

Referring next to FIG. 9, the gear mechanism for driving the maintenance unit 100 will be described. A gear 141 provided at the front side of the maintenance unit 100, is disposed coaxially with an unillustrated conveying roller for conveying a recording sheet, and rotates as receiving the driving force from the conveying roller. A gear 142 meshing the gear 141 has an open-V shaped lever 142*a* which is pivotable coaxially therewith. Attached to one end of the lever 142*a* is a gear 143 meshing the gear 142, forming a so-called planetary gear mechanism. The other end of the lever 142*a* is arranged so as to be able to abut an abutment piece 131*a* formed in the lower side of the upper arm 131.

The gear 141 rotates clockwise during conveyance of a recording sheet, hence the gear 142 rotates counterclockwise while the gear 143 rotates clockwise. This causes the lever 142*a* to rotate counterclockwise, so that the gear 143 is kept from meshing an adjacent gear 144 which is integrally composed of two, large and small-diametric gear elements. The arrows shown in FIG. 9 indicate the movements of the gears 141 to 143 and the lever 142*a* in this state. The lever 142*a*, when it has swayed to the position shown in FIG. 9, will not move further due to the action of an unillustrated stopper. Accordingly, while the head 1 is forming an image on a sheet of recording paper as it being conveyed, no driving force is transmitted to the maintenance unit 100.

When the conveying roller turns in the reverse direction and hence the gear 141 is rotated counterclockwise, the lever 142*a* pivots clockwise. However, if the arms 115 are in a down position as shown by the solid line in FIG. 9, the other end of the lever 142*a* abuts the abutment piece 131*a* of the upper arm 131. Therefore, the gear 143 will not mesh with the gear 144. When the carriage 3 has moved to the maintenance area, the lever 117 rotates as stated above so that the upper arms 131 are raised up to a position indicated by the two-dot chain line in FIG. 9. In this state, the conveying roller turns in the reverse direction, the lever 142*a* sways to a position depicted by the two-dot chain line in FIG. 9, and hence the gear 143 meshes the large-diametric element of the gear 144. Briefly, only when the carriage 3 has moved to the maintenance area and when the conveying roller turns in the reverse direction, the driving force will be transferred to the mechanism located after the gear 144.

Figure 10:
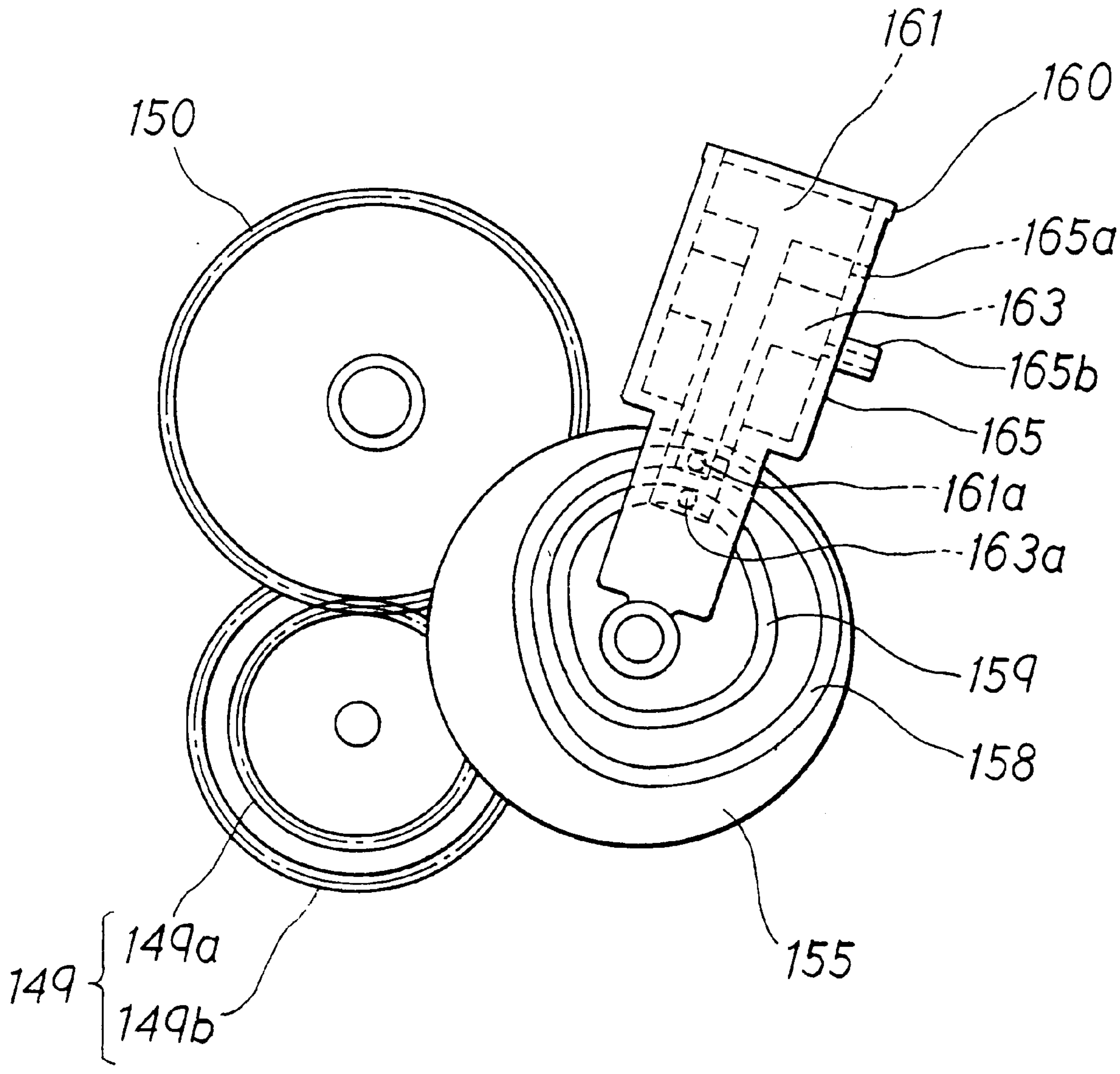
FIG. 10 is a right-side view showing the configuration in the vicinity of a pump for the maintenance unit.

The small-diametric element of the gear 144 meshes a gear 146 via a large-diametric gear 145. This gear 146 has an integrated structure having two, large and small gear elements. The gear 145 meshes the large-diametric element of the gear 146. The unillustrated small-diametric element of the gear 146 is configured to mesh the gear 91 which is exposed to the outside on the left side surface of the cassette 80, when the mounting of the cassette 80 is complete. The large-diametric element of the gear 144 meshes a gear 149 via gears 147 and 148. The gear 149 has two, large and small gear elements integrated therein as shown in FIG. 10. The small-diametric element designated at 149*a* is meshed with the large-diametric gear 150. This gear 150 comes into mesh with the gear 92 of the cassette 80 when the cassette 80 has been completely mounted (FIG. 9). Therefore, if the driving force is transmitted to the gear 144, the gears 91 and 92, and hence the fixed-rate feed roller 85 and winding shaft 87 (FIG. 6), which are integrated therewith, are caused to rotate, thus making it possible to convey the paper from the roll of paper 7.

Further, the large-diametric element 149*b* of the gear 149 meshes a gear 157 which integrally rotates with a grooved cam 155. This grooved cam 155 has two grooves 158 and 159 which are approximately annular but eccentric, as shown in FIG. 10. These grooves 158 and 159 are to drive a pump 160. More specifically, the pump 160 comprises a piston 161 which will be slid by engagement of a pin 161*a* with the groove 158, and a piston 163 which will be slid by engagement of a pin 163*a* with the groove 159. A cylinder 165, into which the pistons 161 and 163 which are fitted has an intake port 165*a* and an exhaust port 165*a* formed therein.

Accordingly, as the grooved cam 155 rotates, the pistons 161 and 163 slidingly move out of phase from each other so that the volume of the space created between the two varies. Further, since in this case one of the ports, either the intake port 165*a* or exhaust port 165*b* is closed by piston 161 or 163, compressed air can be sent into air chamber 20 of the head 1 via the pipe 57 (FIG. 3) from exhaust port 165*b*. Therefore, when the conveying roller is reversed after the carriage 3 has been moved to the maintenance area, it is possible to implement the aforementioned purging whilst the roll of paper 7 is being conveyed.

Figure 11A:
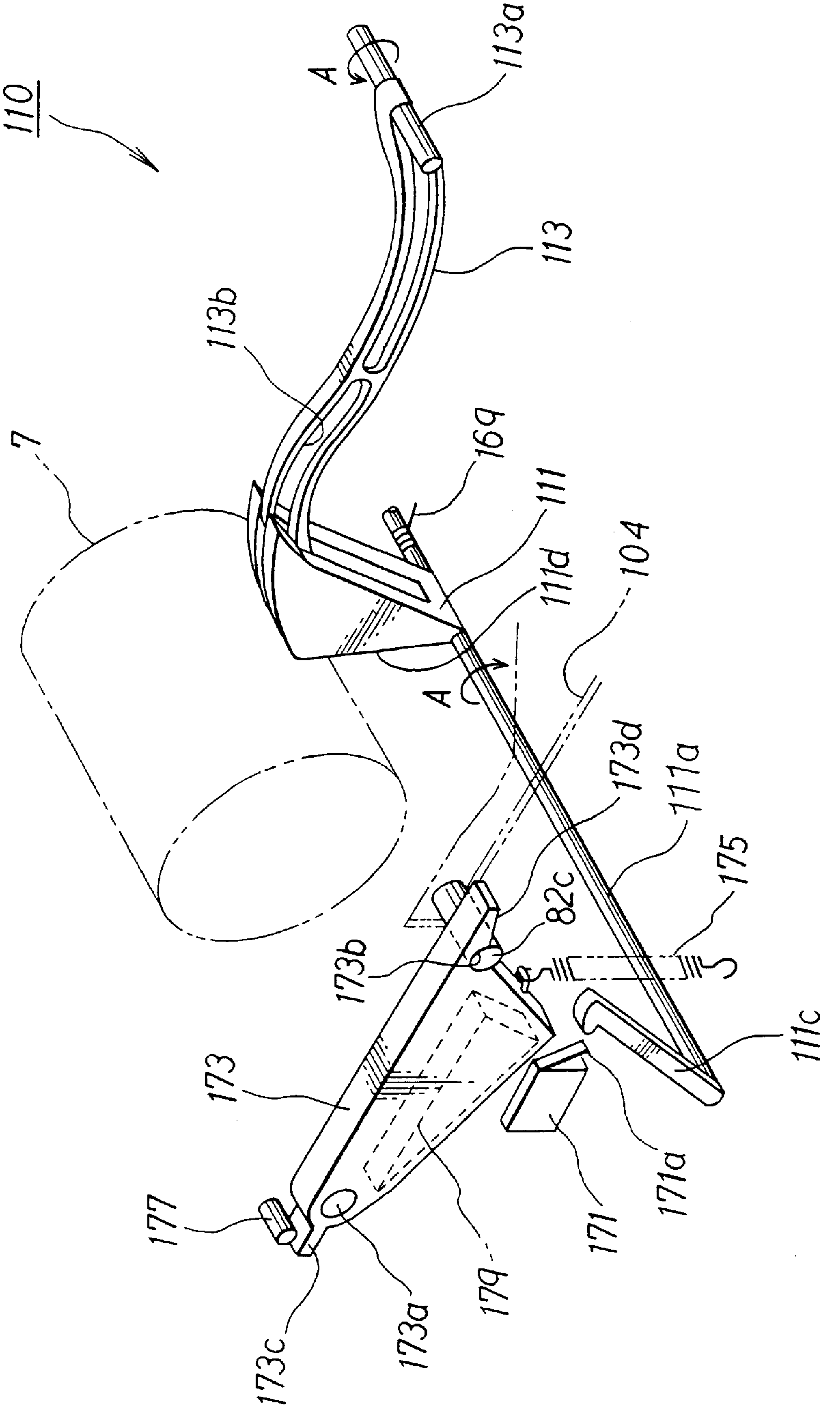
FIGS. 11A and 11B are perspective and partial sectional views showing the configuration of a sensor in the maintenance unit.
Figure 11B:
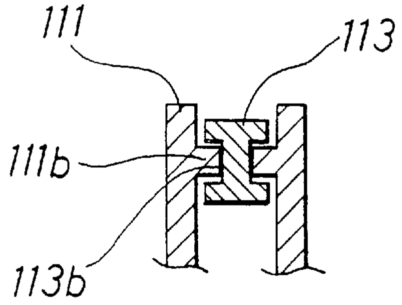
Figure 12:
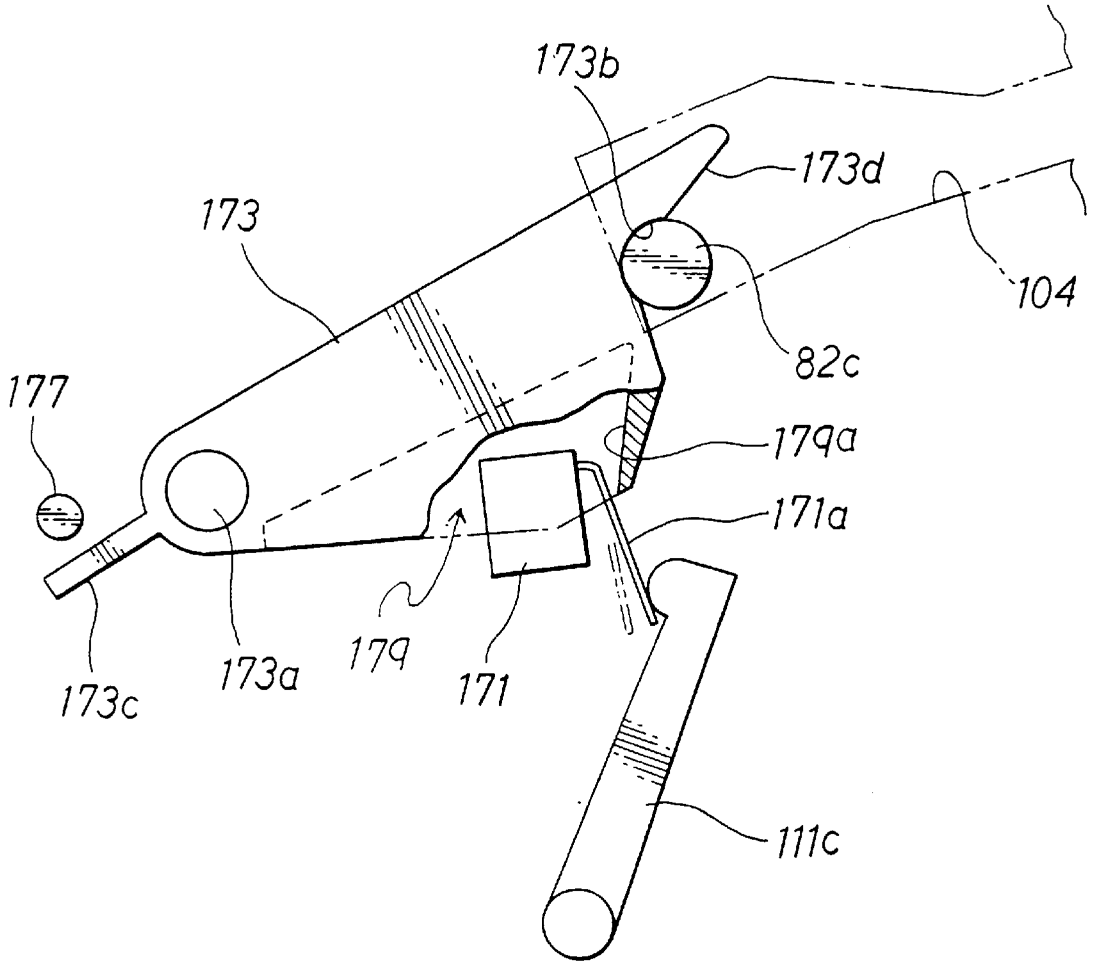
FIG. 12 is an illustrative view showing the configuration and operation of the sensor.

Next, the configuration of the sensor 110 will be described with reference to FIGS. 11A, 11B and 12. As shown in FIG. 11A, the movable part (first pivot arm) 113 is constituted of an S-shaped rod-like member having the shaft 113*a* at one end as a pivot, and has an elongated groove 113*b* on either side thereof from the distal end to the middle. The movable part (second pivot arm) 111 is configured so as to hold the movable part 113 on either side. That is, as shown in partial sectional view of FIG. 11B and in FIG. 8, the movable parts 111 are formed with projections 111*b* which are engaged into grooves 113*b* on either side. In this arrangement, when either the movable part 111 or 113 sways in the direction indicated by arrow A, the movement causes the engaging point of the projections 111*b* with the grooves 113*b* to move toward the shaft 113*a*. With this movement, the other movable part, either 113 or 111, also sways in the direction indicated by arrow A, whereby the two parts retract folding into each other. The movable part 111 is urged by a torsional coil spring 169 provided for the shaft 111*a*, in the direction opposite to the arrow A. Accordingly, with no cassette 80 installed, the projections 111*b* stay engaged near the distal end of the grooves 113*b*, so the movable parts 111 and 113 are connected to each other at their distal ends, producing an angled profile.

When the cassette 80 is loaded or unloaded, the movable part 113 or 111 is pushed by the underside of the casing 82 of the cassette 80 (the lower right portion of the cassette 80 shown in FIGS. 5 and 6) to sway in the direction of arrow A so that the movable parts 111 and 113 retract folding into each other. With the cassette 80 completely mounted in place, the movable parts 111 and 113 project into the interior of the cassette 80 from the opening 82*d* so that the movable part 111 abuts the unused roll of paper 7. Accordingly, if there is an ample amount of unused roll of paper 7 left, the movable part 111 has swayed relatively further in the direction of arrow A, and as the roll of paper 7 is consumed, the part 111 moves in the direction opposite to the arrow A. In the arrangement of the sensor 110, a lever 111*c* (second movable member) which sways together with the movable part 111 about shaft 111*a*, is provided outside the side frame 103 while a limit switch 171 is placed near the distal end of the lever 111*c*.

The limit switch 171 is disposed in a position where the movable part, designated at 171*a*, can be pushed so that the switch will be turned on when the lever 111*c* has moved the predetermined amount as the roll of paper 7 has decreased. Therefore, when the cassette 80 is completely mounted in place, the activation of the limit switch 171 can indicate that the roll of paper 7 is nearly used up, or that replacement time is approaching. It should be noted that the movable part 111*c* corresponds to the second movable part and the position to where the lever 111*c* has swayed by the predetermined amount corresponds to the second predetermined position. It should be also understood that the limit switch 171 is depicted as being shifted to some degree in the drawing in FIG. 11A for ease of description.

Disposed above the lever 111*c* is a first movable part 173 which pivots about axle 173*a*. This movable part 173 has an engaging portion 173*b* which comes down and becomes engaged with the pin 82*c* which is guided along the guide 104 when the cassette 80 is completely mounted in place. The movable part 173 is urged downwards by a helical tension spring 175 so that a projection 173*c* in the proximal end abuts a stopper 177, whereby a further movement downwards is stopped. A hollow 179 is formed in the underside of the movable part 173. As shown in FIG. 12, when the movable part 173 moves downwards, the interior wall designated at 179*a* inside hollow 179 presses the movable part 171*a* to turn on the limit switch 171. Here, the movable part 173 corresponds to the first movable part while the position where the projection 173*c* abuts the stopper 177 corresponds to the first position. Therefore, with no cassette 80 in, the movable part 173 sways to a position where the projection 173*c* abuts the stopper 177, and thereby activates the limit switch 171.

When the cassette 80 is inserted, the pin 82*c* abuts a slant 173*d* at the distal end of the movable part 173 and pushes up the part 173. Subsequently, when the cassette 80 has been totally mounted, and the pin 82*c* is placed at the closed end (the front side) of the guide 104, the movable part 173 deflects downward slightly so that the engaging portion 173*b* fits on the pin 82*c*. Under this condition, the interior wall of the hollow 179 will not abut the movable part 171*a*, so the limit switch 171 stays off. The pin 82*c* is shaped in a cylindrical form while the engaging portion 173*b* is formed with a concave surface mating with the peripheral surface of the cylinder. Therefore, when the engaging portion 173*b* becomes engaged with the pin 82*c*, this engagement also functions to fix the position of the cassette 80.

In the sensor 110 thus configured, when no cassette 80 is installed, the movable part 173 will have moved down while the lever 111*c* will have rotated in the direction opposite to the arrow A, so that both of them activate the limit switch 171. In this condition, the distal end of the lever 111*c* may overlap the movable part 173. It is also possible to arrange them both so as not to overlap at all with each other. FIG. 12 shows the case where the two do not overlap with each other.

When the cassette 80 is inserted, the underside of the casing 82 (the lower end face below the pin 83 of the cassette 80) presses a roll detecting face 111*d* of the movable part 111 so that the movable part 111 and lever 111*c* together rotate in the direction of arrow A. At this movement, however, the movable part 173 will not move and continues to activate the limit switch 171. When the cassette 80 has been completely mounted, the movable part 173 moves upward so that the interior wall of the hollow 179 will no longer press the movable part 171*a*. In this situation, the movable parts 111 and 113, specifically, the folded portion of the two or the roll detecting face 111*d* of the movable part 111, projects into the interior of the cassette 80 through the opening 82*d*. However, if an adequate amount of an unused roll of paper 7 is left inside the cassette 80, the peripheral surface of the roll of paper 7 pushes the roll detecting face 111*d* so that the lever 111*c* rotates in the direction away from the movable part 171*a*. As a result, the lever 111*c* is out of contact with the limit switch 171 so that the limit switch 171 remains off. As the roll of paper 7 is consumed and the unused roll of paper 7 reduces, the roll detecting face 111*d* ascends and the lever 111*c* rotates toward the limit switch 171, to thereby turn on the limit switch 171.

In this way, the limit switch 171 is only turned off when the cassette 80 is completely mounted and when adequate amount of an unused roll of paper 7 exists. That is, if either of these conditions are not met, the switch will be turned on. In conclusion, it is possible for the sensor 110 to determine, from the detection of a single limit switch 171, whether the above two conditions simultaneously hold which are required for implementation of purging.

With the sensor 110 configured as above, it is possible to simplify and make compact the configuration for detecting whether the roll of paper 7 exists or not. Accordingly, in the present ink-jet printer, it is possible to make the maintenance unit 100 compact in a beneficial way, so that it is possible to secure a wide print range without making the whole apparatus body bulky. Further, since the sensor 110 has a simple structure using only a single limit switch 171, it is also possible to successfully reduce the production cost in a beneficial way of the ink-jet printer.

Further, the roll of paper 7 rolled and provided on the periphery of the pin 83 is in close contact with the core. The movable part 111 moves toward the core of the roll of paper 7 as the roll of paper 7 decreases. Since the sensor 110 detects the presence of the roll of paper 7 based on the sway of the roll detecting surface 111*d*, it is possible to detect the presence of a residual amount with a much higher precision, which would be unfeasible in the case of the detection of the cut sheets. Accordingly, when the switching control between the active state and prohibited state of the reverse rotation of the aforementioned conveying roller is adapted to be performed or when a predetermined error message is adapted to be output, it is possible to markedly effectively prevent failures in producing a good image due to imperfect implementation of the maintenance action such as purging etc., and also it is possible to minimize the occurrence of the prohibited state and the number of outputted error message.

The movable parts 111 and 113 project out forming an angled profile with their distal ends coupled to each other when no cassette 80 is loaded or when a cassette 80 is completed mounted. Therefore, when cassette 80 abuts either the movable part 111 or 113, the abutted movable part can sway easily. This movement causes the pair of movable parts 111 and 113 to fold into each other and retract. This configuration makes it possible to prevent the movable parts 111 and 113 from snagging with the cassette 80 when it is taken in and out and can also save space for accommodating the swaying movable parts 111 and 113. Further, this configuration enhances the geometrical flexibility of the arrangement of the movable parts 111 and 113. Moreover, since in the sensor 110, the joint for coupling the movable parts 111 and 113 is configured so that the grooves 113*b* of the movable part 113 are engaged with the projections 111*b* of the movable part 111, thus achieving a markedly simple joint configuration, the arrangement can be further simplified. All of these factors contribute to making the maintenance unit 100 of the ink-jet printer compact. Further, it is also possible to reduce the production cost for the maintenance mechanism and the printer.

Figure 16:
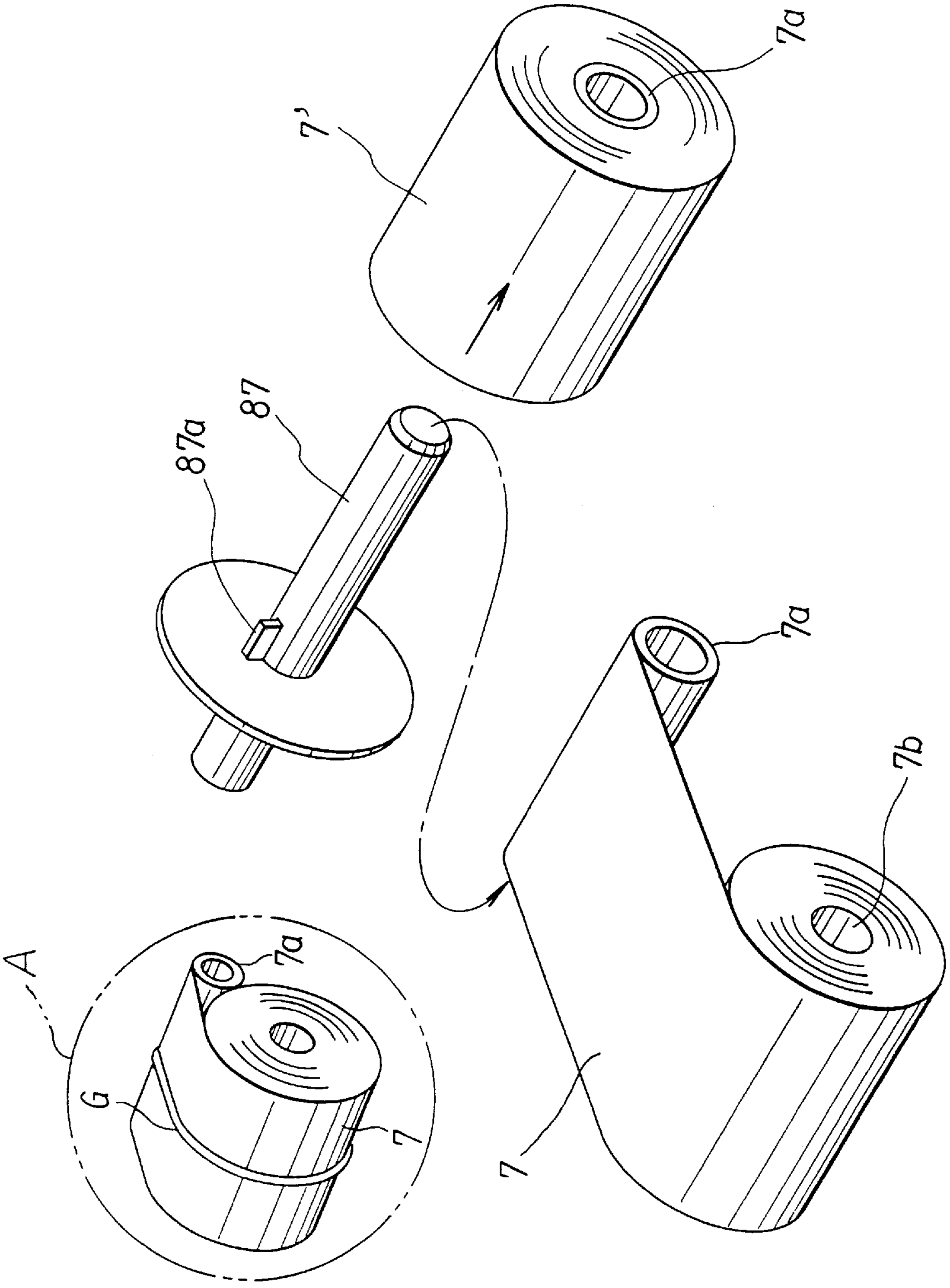
FIG. 16 is a view illustrating the method of replacing a roll of paper for the cassette.

FIG. 16 is an illustrative view showing the method of replacement of the roll of paper in the cassette 80. A fresh roll of paper 7 in this embodiment is supplied with a paper sleeve 7*a* attached to the leading end of the paper. This fresh roll of paper 7 is one which is referred to as ‘coreless’, because it has no paper sleeve as the winding core for the roll. Therefore, when the roll of paper 7 is used up, nothing remains on the pin 83 of the cassette 80 shown in FIG. 15, so the task of removing a paper sleeve can be skipped. When a fresh roll of paper 7 is mounted, the winding shaft 87 is taken out from the cassette 80 and is inserted into the paper sleeve 7*a*. At this moment, the paper sleeve 7*a* which had been attached beforehand to the leading end of paper, becomes engaged with a projection 87*a* formed on the peripheral side of the winding shaft 87 so that the sleeve cannot rotate relative to the winding shaft 87. Then, the winding shaft 87 is attached to the casing 82 while the axial hollow, designated at 7*b*, of the roll of paper 7 is made to engage with the pin 83 of the casing 82, to complete the mounting of the roll of paper 7. Subsequently, the cassette 80 is re-assembled and mounted into the maintenance unit 100, so it is possible to execute the maintenance action using a fresh roll of paper 7.

A roll of paper 7' which has been used up, can all be taken up onto the winding shaft 87. Therefore, when the used roll of paper 7' is taken out together with the paper sleeve 7*a* from the winding shaft 87, it is possible to just discard the roll of paper 7' alone. Thus, this state enables attachment of a fresh roll of paper 7 as stated above.

In the above way, when a roll of paper 7 has been used up by the maintenance operation in the cassette 80 of this embodiment, it is possible to reuse the cassette 80 replacing only the used roll of paper 7 with a new one. Therefore, it is not only possible to reduce the cost imposed on the user for the replacement of a roll of paper 7 but also contribute to the solution of environmental problems and the problems of refuse. The rolls of paper 7 of this embodiment may be sold separately from the cassette 80. For example, a set of one cassette 80 with five rolls of paper 7 (each roll of paper 7 can be compactly packed by binding with a rubber band G or tape etc., as shown in the illustration encircled by A in FIG. 16, so that the paper sleeve 7*a* attached to the paper leading end will not be separated.), can be sold. After a certain time of use the cassette 80 will need replacement. Therefore, sale of a number of rolls of paper 7 corresponding to the durability of the cassette 80 as a set with one cassette 80 as in the latter case, is remarkably advantageous to the user. This, for example, makes it possible to prevent insufficient implementation of the maintenance operation due to an overuse of the same cassette 80.

In this embodiment, it is also possible to replace the roll of paper 7 together with the cassette 80. In this way, if the whole cassette 80 with a roll of paper 7 is replaced, the replacement of the roll of paper 7 can be performed in a simple manner, without dirtying the user's hands. That is, in accordance with this embodiment it is possible for a user to either replace the roll of paper 7 only, or replace the whole cassette 80 with a roll of paper 7, at their discretion.

Further, the cassette 80 is configured so as to be disassembled into individual parts. Accordingly, the cassette 80 can be disassembled into pieces when it needs to be discarded, thus further contributing to the solution of environmental problems and the problems of refuse. For example, the volume of refuse can be markedly reduced. Further, since the cassette 80 is produced without bonding the parts with adhesive, the manufacturing steps can be simplified, resulting in a reduction in the manufacturing cost. Moreover, since the manufacturing steps are simplified, it is possible to make the cassette 80 itself compact. Therefore, the use of cassette 80 makes it possible to further promote a reduction in cost and size of the ink-jet printer.

Again, most of the parts which are configured so as to be disassembled can be assembled by elastically deforming one part and fitting it to the others. Therefore, despite the fact that the cassette 80 is configured so as to be disassembled into individual parts, it is possible to secure a relative high mechanical strength, and still have ease of disassembly. Accordingly, in accordance with the cassette 80 of this embodiment, it is possible to enhance the durability during use by securing a sufficient mechanical strength as well as to provide an easy disassembly configuration and hence improve the handling performance of disassembly when it needs to be discarded.

The present invention should not be limited by the above embodiment, and can be embodied in a variety of forms without departing from the range of the invention as hereinafter claimed. The object to be detected by the detector is not limited to a rolled strip form but may be of stacked cut sheets. The strip may be felt, film etc., other rolls of paper, and can be used for maintenance applications other than for reception of ink and wiping of a nozzle surface. Here, it should be noted that wiping of a nozzle surface includes: frictional rubbing with the strip whilst it is abutted against the nozzle surface; and also mere abutment of the strip against the nozzle surface. Further, in the above embodiment, the cassette is disassembled without using any tools, but the disassembly may also be performed using a simple set of tools. In this case, it is possible to provide a further enhanced assembled cassette. In contrast, if, as in the above embodiment, the cassette is configured so as to be disassembled without any tools, the assembly and disassembly can be further simplified and hence the handling performance when discarding can be further enhanced.

The limit switch 171 may be of a type which is turned off when the movable part 171*a* is pushed. Further, although a limit switch 171 is used as the switch or sensor in the above embodiment, various other configurations can be used. For example, it is possible to configure the lever 111*c* and movable part 173 using magnets while disposing a Hall element as the detecting means at the position where the limit switch 171 was provided. In this case, the Hall element can detect the movement or approaching thereto of at least one of the lever 111*c* or movable part 173, producing the same function and effect as in the above embodiment. Further, the present invention can be used for applications other than an ink-jet printer, as long as the application is to detect whether the strip-like material wound in a roll and stored in a cassette is present or not. For example, the present invention can be applied to a cassette accommodating a roll of chart paper used for a variety of analyzers. In the above embodiment, since the roll of paper 7 is of a coreless type, a further more reliable detection can be performed by the sensor 110.

The shapes, positioning, etc. of the movable parts 111 and 113 may be modified in various ways so as to detect an object other than the cassette. Nevertheless, in the maintenance unit 100, etc., of the above embodiment, there is no marginal space in the front portion. In order to detect the roll of paper 7 inside the cassette 80, it is most effective to configure a movable part or parts projecting out from the side along the path of movement of the cassette 80 as in the above embodiment. However, in the case of conventional object presence detectors, if the movable part was projected from the side along the path of movement of the cassette 80, the movable part would snag the cassette 80, so it was very difficult to perform such a detection. In contrast, in the above embodiment, a unique assembly configuration for coupling the movable parts 111 and 113 enables a markedly beneficial detection without causing snagging as stated above. In the above embodiment, since the roll of paper 7 is of a coreless type, a further reliable detection can be achieved by the sensor 110.

What is claimed is:

1. A detector for detecting whether an object in a cassette is present comprising:

- a first movable part positioned at a first position when a cassette is not positioned at a predetermined mounting position;
- a second movable part positioned at a second position when an insufficient amount of the object or no object resides in the cassette; and
- a switch which is pressed by the first movable part when the first movable part is positioned at the first position, wherein the switch is also pressed by the second movable part when the second movable part is positioned at the second position.

2. The detector according to claim 1, wherein the switch outputs a predetermined signal when the switch is pressed by at least one of the first and second movable parts.

3. The detector according to claim 1, wherein the object is a strip wound in a roll form.

4. The detector according to claim 1, wherein the first movable part comprises: a pivot shaft; an engaging portion which pivots about the pivot shaft and becomes engaged with a positioning pin of the cassette; and a spring which is coupled with the engaging portion and urges the first movable part so as to position it at the first position.

5. The detector according to claim 1, further comprising:

- a first pivot arm having an elongated groove and a second pivot arm having a projection, the projection engaging the elongated groove such that the first and second pivot arms fold into each other, wherein the first and second pivot arms are urged so as to project into the interior of the cassette through an opening formed in the cassette when the object does not reside in the cassette, and when the object resides in the cassette, at least one of the first and second pivot arms comes in contact with the object inside the cassette so that the projection slides within the elongated groove such that the first and second pivot arms retract through the opening from the cassette, wherein the second movable part is a lever connected to the second pivot arm.

6. The detector according to claim 1, wherein the object is a strip in roll form for use in wiping a head surface of an ink-jet recording apparatus, and the cassette is one which is mounted to the ink-jet recording apparatus.

7. An ink-jet recording apparatus comprising:

an ink-jet recording head having a nozzle for ejecting ink;

a strip for wiping the head surface in which the nozzle is formed;

a cassette for accommodating the strip in a roll form; and a detector for detecting a residual quantity of the strip in the cassette, wherein the detector comprises: a first movable part positioned at a first position when a cassette is not positioned at a predetermined mounting position; a second movable part positioned at a second position when an insufficient quantity of the strip in the roll form or no strip in the roll form resides in the cassette; and a switch which is pressed by the first movable part when the first movable part is positioned at the first position, and which is also pressed by the second movable part when the second movable part is positioned at the second position.

8. The ink-jet recording apparatus according to claim 7, wherein the detector comprises:

a first pivot arm having an elongated groove and a second pivot arm having a projection, the projection engaging the elongated groove such that the first and second pivot arms fold into each other, and the first and second pivot arms are urged so as to project into the interior of the cassette through an opening formed in the cassette when the roll of the strip does not reside in the cassette, and when the roll of the strip resides in the cassette, at least one of the first and second pivot arms comes in contact with the roll of the strip inside the cassette so that the projection slides within the elongated groove such that the first and second pivot arms fold into each other to retract through the opening from the cassette, and the second movable part is a lever connected to the second pivot arm.

9. The ink-jet recording apparatus according to claim 8, wherein the cassette has a pin that engages an engaging groove formed in the recording apparatus when mounted in the ink-jet recording apparatus, and the first movable part comprises: a pivot shaft; an engaging portion which pivots about the pivot shaft and becomes engaged with the pin; and a spring which is coupled with the engaging portion and urges the first movable part toward the first position.

10. The ink-jet recording apparatus according to claim 8, wherein the cassette is of a type in which the strip is attachable and removable.

11. The ink-jet recording apparatus according to claim 10, wherein the cassette comprises a shaft for taking up the strip, a fixed-rate feed roller, a casing and a cover, and the cassette can be disassembled by elastically deforming at least one of the components.

12. A detector for detecting the presence of an object by being in contact with the object within the detection area, comprising:

a first pivot arm having a first engaging portion and a second pivot arm having a second engaging portion which slidably engages with the first engaging portion, the first engaging portion engaging the second engaging portion such that the first and second pivot arms fold into each other, wherein the first and second pivot arms are urged so as to project into the detection area when the first and second pivot arms are out of the contact with the object, and when at least one of the first and second pivot arms comes in contact with the object, the first and second pivot arms retract and fold into each other when the first engaging portion slides on the second engaging portion to thereby detect the presence of the object.

13. The detector according to claim 12, wherein the first pivot arm has a shaft at a distal end of the first pivot arm that causes the first pivot arm to pivot due to the sliding movement of the first engaging portion along the second engaging portion.

14. The detector according to claim 13, wherein the second pivot arm further comprises a pivot shaft.

15. The detector according to claim 14, further comprising: a lever attached to an end of the pivot shaft of the second pivot arm.

16. The detector according to claim 15, further comprising: a switch contactable by the lever when the lever rotates.

17. The detector according to claim 12, wherein at least the first pivot arm is S-shaped.

18. The detector according to claim 12, further comprising a first movable part positioned at a first position when the cassette is not positioned at a predetermined mounting position, wherein a switch is pressed by the first movable part when the first movable part is positioned at the first position.

19. The detector according to claim 18, further comprising:

a pin provided for a cassette, wherein the first movable part engages the pin when the cassette is loaded into the recording apparatus;

pivot shafts for each of the first and second pivot arms; and a rotational lever provided for the second pivot shaft, the lever being contactable with the switch, wherein the first movable part rotates and presses the switch when any one of no cassette is loaded in the recording apparatus, the cassette is not mounted correctly, and an insufficient amount of a roll-like strip material resides in the cassette.

20. A detector comprising:

a first pivot arm having a projection and being pivotally supported at a first end of the first pivot arm; and a second pivot arm having an elongated groove formed along a length of the second pivot arm and being pivotally supported at a first end of the first pivot arm, wherein the first and second pivot arms are disposed opposing each other such that the projection of the first pivot arm engages the elongated groove of the second pivot arm, and when an object to be detected is out of contact with a detecting portion constituted by the first and second pivot arms, the detecting portion stays in an arched form, whereas when the object is in contact with the detecting portion, the projection slides along the elongated groove such that the arch becomes contracted.

21. The detector according to claim 20, wherein the object is provided in a roll form.

* * * * *